(12) United States Patent
Abreu

(10) Patent No.: US 10,389,014 B2
(45) Date of Patent: Aug. 20, 2019

(54) ANTENNA CONFIGURATION FOR MOBILE COMMUNICATION DEVICE

(71) Applicant: GEELUX HOLDINGS, LTD., Tortola (VG)

(72) Inventor: Marcio Marc Abreu, Bridgeport, CT (US)

(73) Assignee: Geelux Holdings, Ltd., Tortola (VG)

( * ) Notice: Subject to any disclaimer, the term of this patent is extended or adjusted under 35 U.S.C. 154(b) by 157 days.

(21) Appl. No.: 15/413,389

(22) Filed: Jan. 23, 2017

(65) Prior Publication Data

US 2017/0214126 A1   Jul. 27, 2017

Related U.S. Application Data

(60) Provisional application No. 62/281,540, filed on Jan. 21, 2016, provisional application No. 62/288,587, filed on Jan. 29, 2016, provisional application No. 62/294,384, filed on Feb. 12, 2016.

(51) Int. Cl.
| | |
|---|---|
| *H01Q 1/08* | (2006.01) |
| *H01Q 1/24* | (2006.01) |
| *H01Q 1/12* | (2006.01) |
| *H01Q 1/44* | (2006.01) |
| *H04B 1/3827* | (2015.01) |

(52) U.S. Cl.
CPC ............. *H01Q 1/245* (2013.01); *H01Q 1/084* (2013.01); *H01Q 1/1264* (2013.01); *H01Q 1/244* (2013.01); *H01Q 1/44* (2013.01); *H04B 1/3838* (2013.01)

(58) Field of Classification Search
CPC .......... H01Q 1/245; H01Q 1/084; H01Q 3/26; H01Q 21/06; H01Q 21/22

USPC .......................................................... 343/880
See application file for complete search history.

(56) References Cited

U.S. PATENT DOCUMENTS

| | | | |
|---|---|---|---|
| 5,029,239 | A | 7/1991 | Nesbit |
| 5,214,437 | A | 5/1993 | Hensler |
| 5,524,284 | A | 6/1996 | Marcou et al. |
| 5,532,703 | A | 7/1996 | Stephens et al. |
| 5,926,138 | A | 7/1999 | Eerikainen |
| 6,104,350 | A * | 8/2000 | Ng .......................... H01Q 1/245 343/702 |
| 6,400,326 | B1 | 6/2002 | Green, Jr. |
| 6,665,543 | B1 * | 12/2003 | McCleary ............. G06F 1/1626 343/723 |
| 2005/0057404 | A1 | 3/2005 | Demicco et al. |
| 2008/0100518 | A1 | 5/2008 | Lev et al. |
| 2008/0261546 | A1 | 10/2008 | Mellage et al. |

(Continued)

OTHER PUBLICATIONS

International Search Report and Written Opinion; PCT/US2017/014637; dated May 19, 2017; 13pp.

(Continued)

*Primary Examiner* — Huedung X Mancuso
(74) *Attorney, Agent, or Firm* — Studebaker & Brackett PC

(57) ABSTRACT

The embodiments of the present disclosure provide positions of an antenna of a mobile communication device in a location that places the antenna at a spaced distance from a user and/or the brain of the user to reduce the amount of RF energy that impinges on the brain of the user when the mobile communication device is in use and held near the face of a user.

6 Claims, 38 Drawing Sheets

(56) References Cited

U.S. PATENT DOCUMENTS

2012/0306715 A1 12/2012 Montgomery et al.
2013/0099983 A1 4/2013 Han et al.

OTHER PUBLICATIONS

International Preliminary Report on Patentability; PCT/US2017/014637; dated Aug. 2, 2018; 9 pp.

* cited by examiner

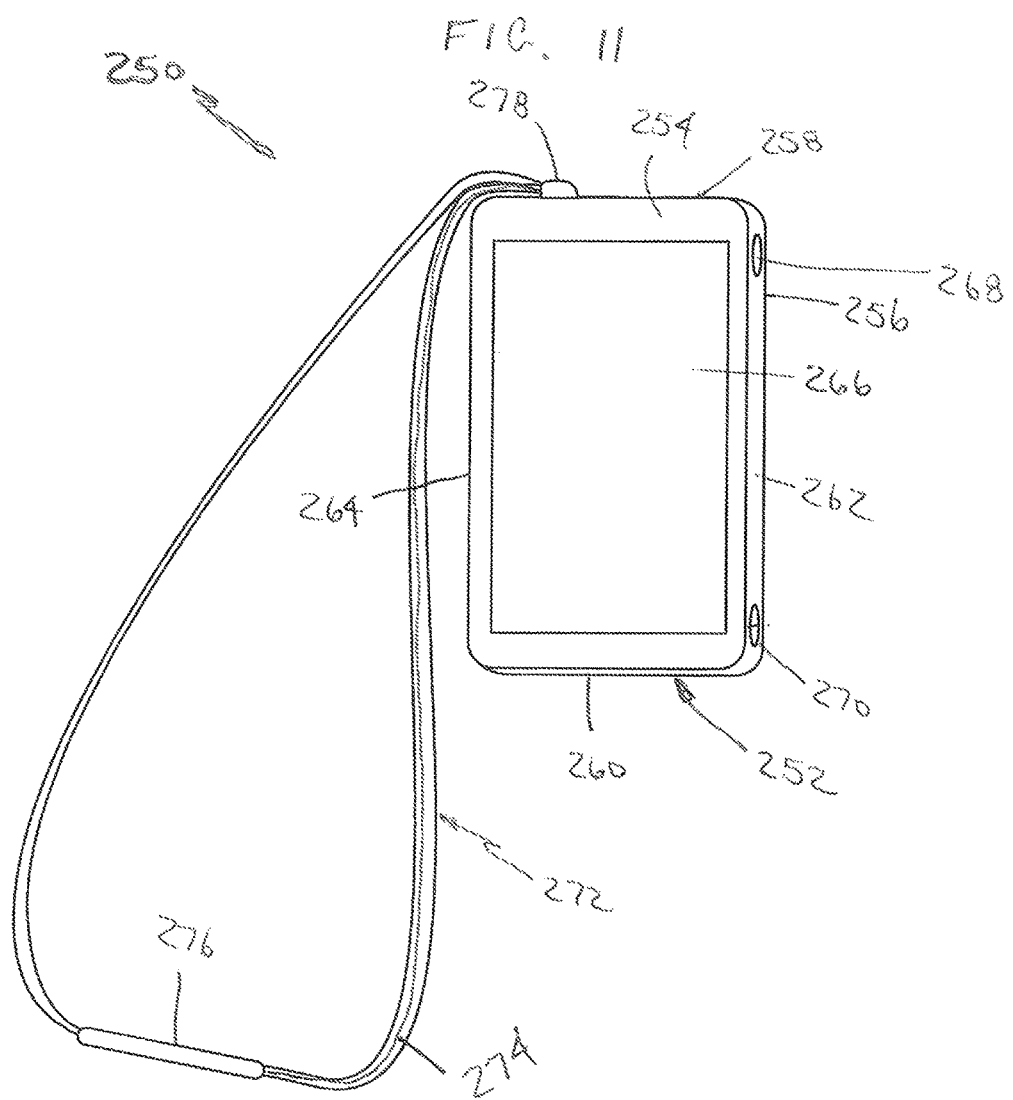

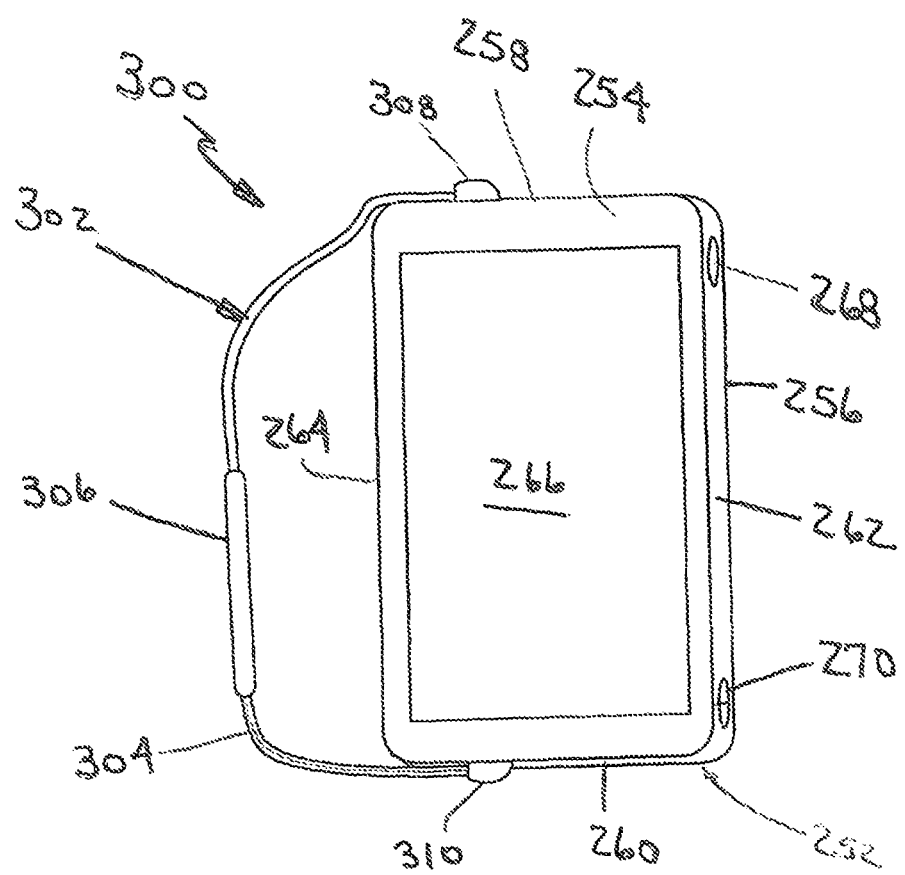

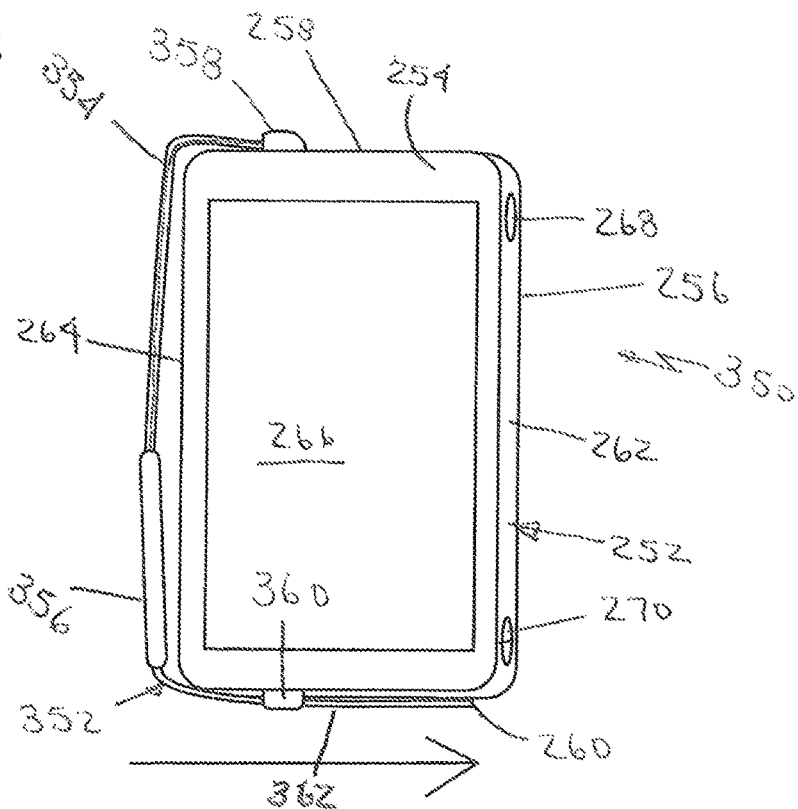
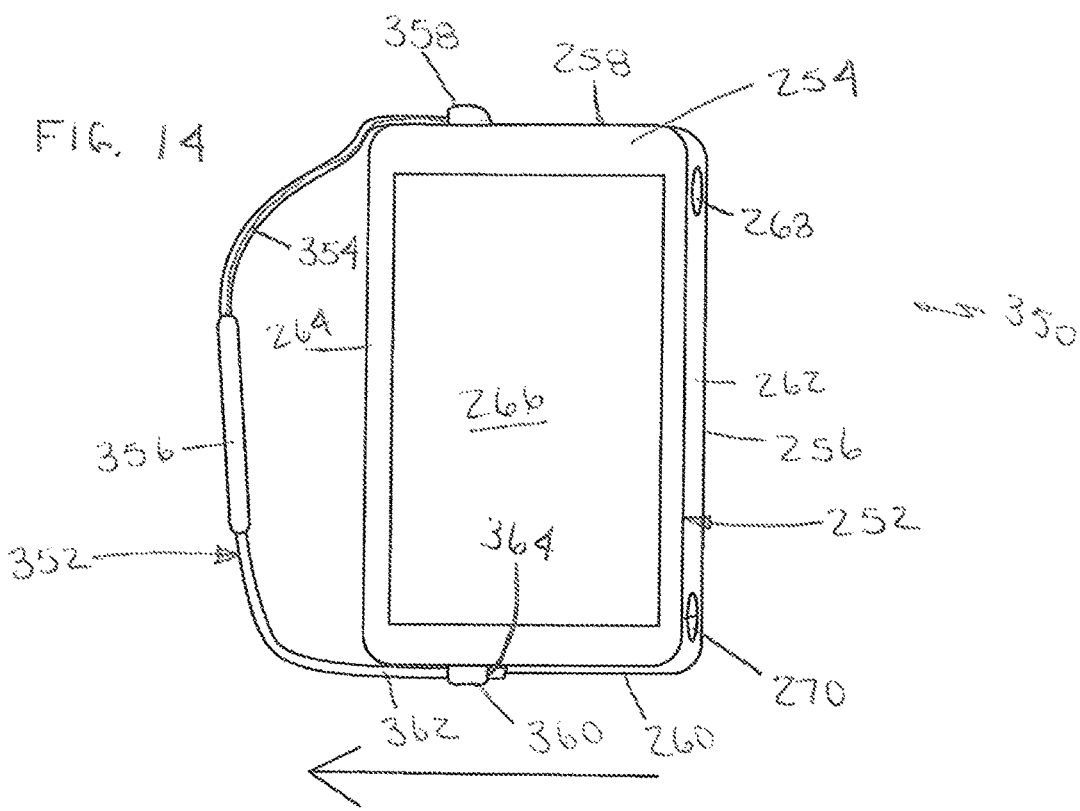

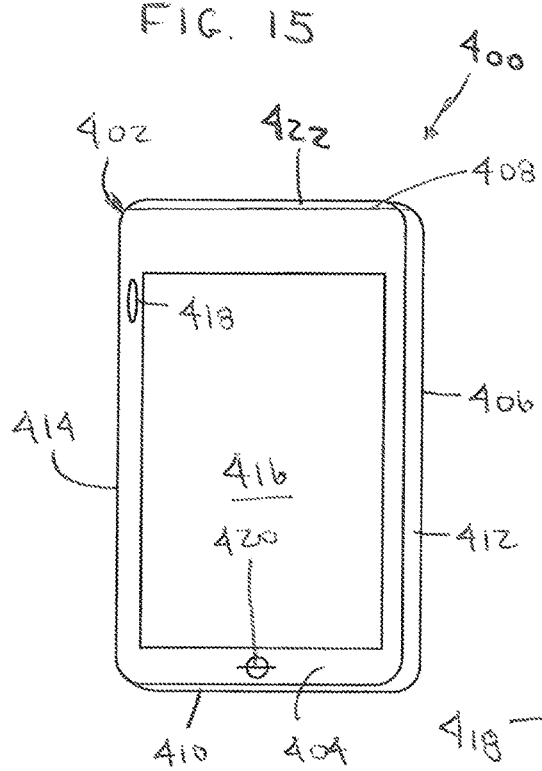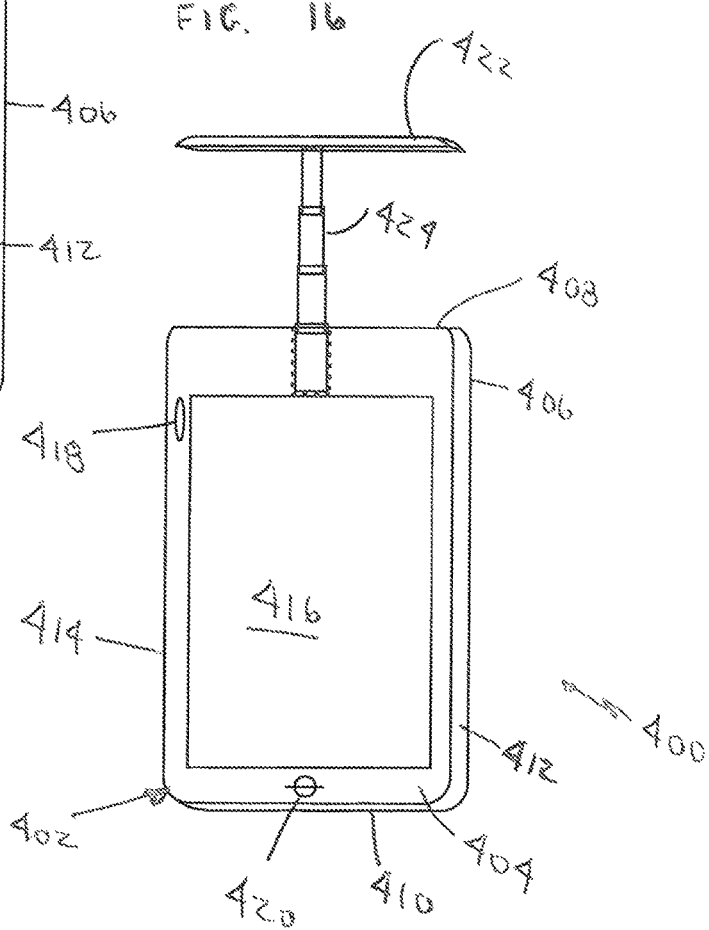

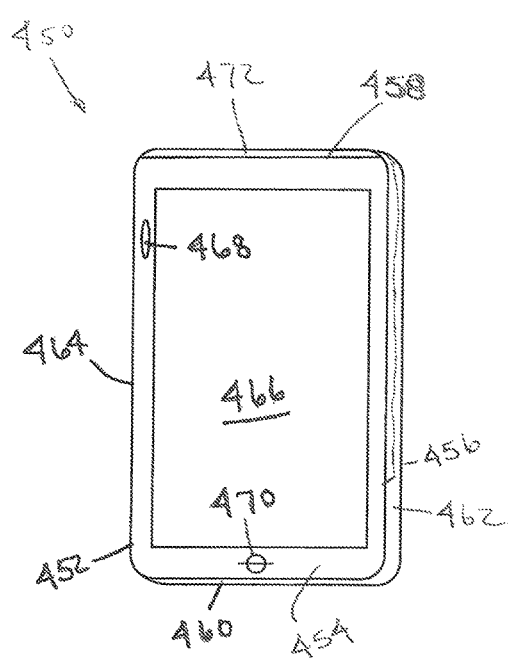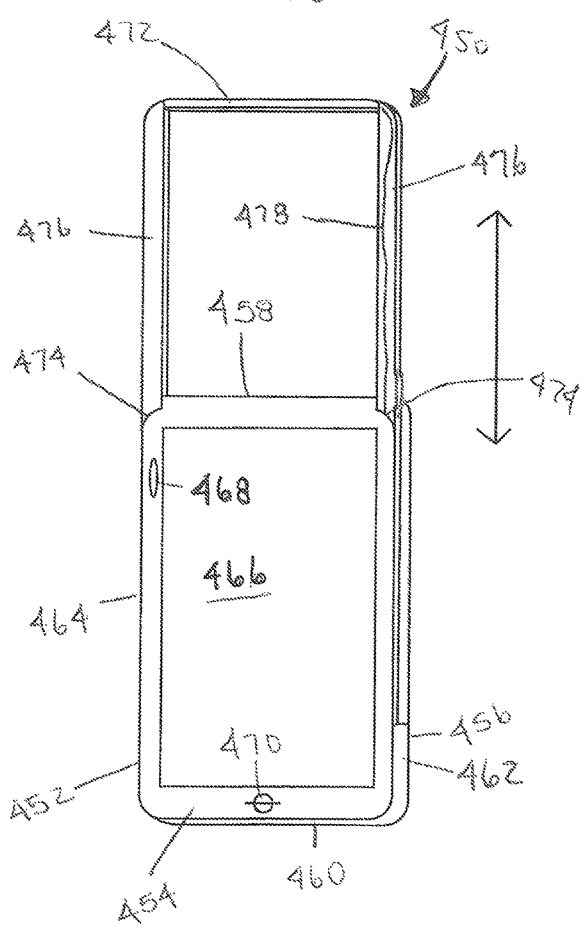

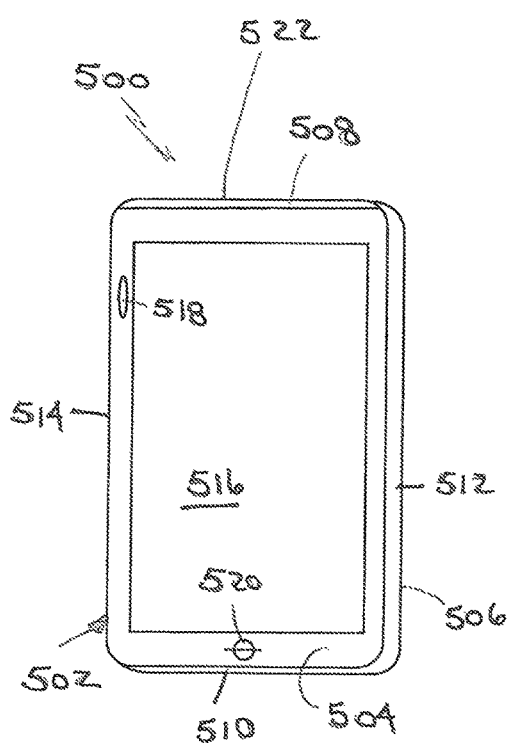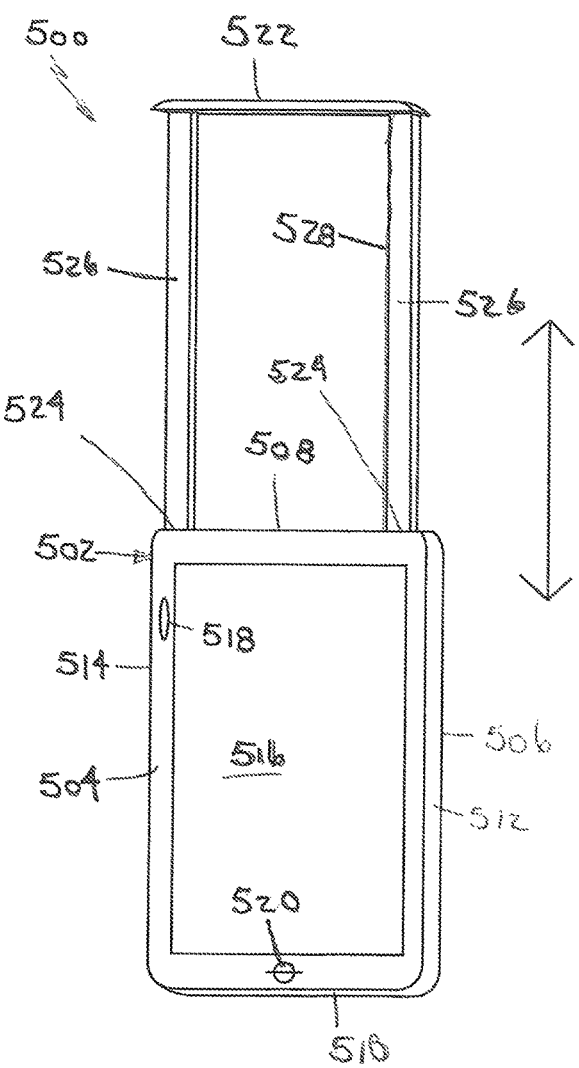

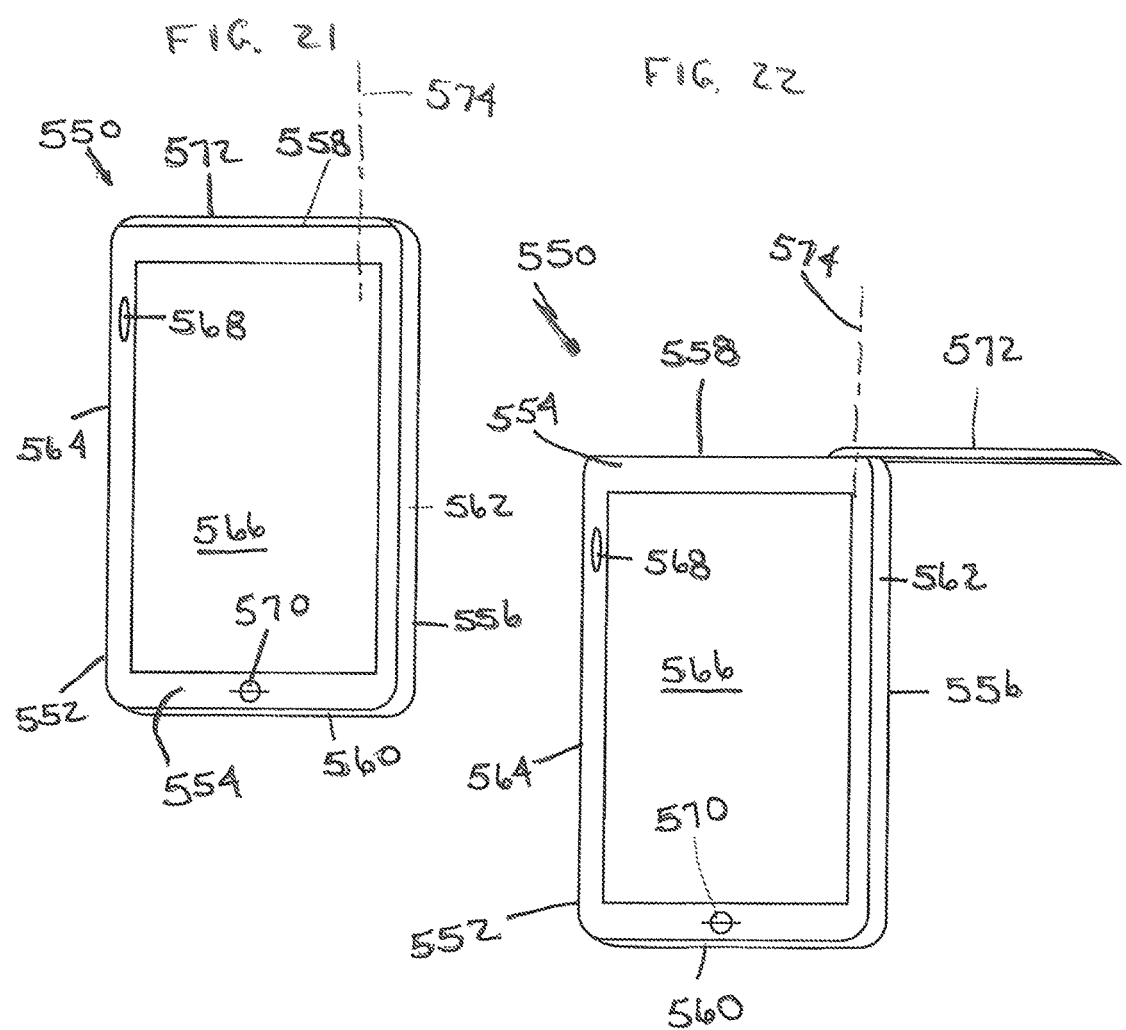

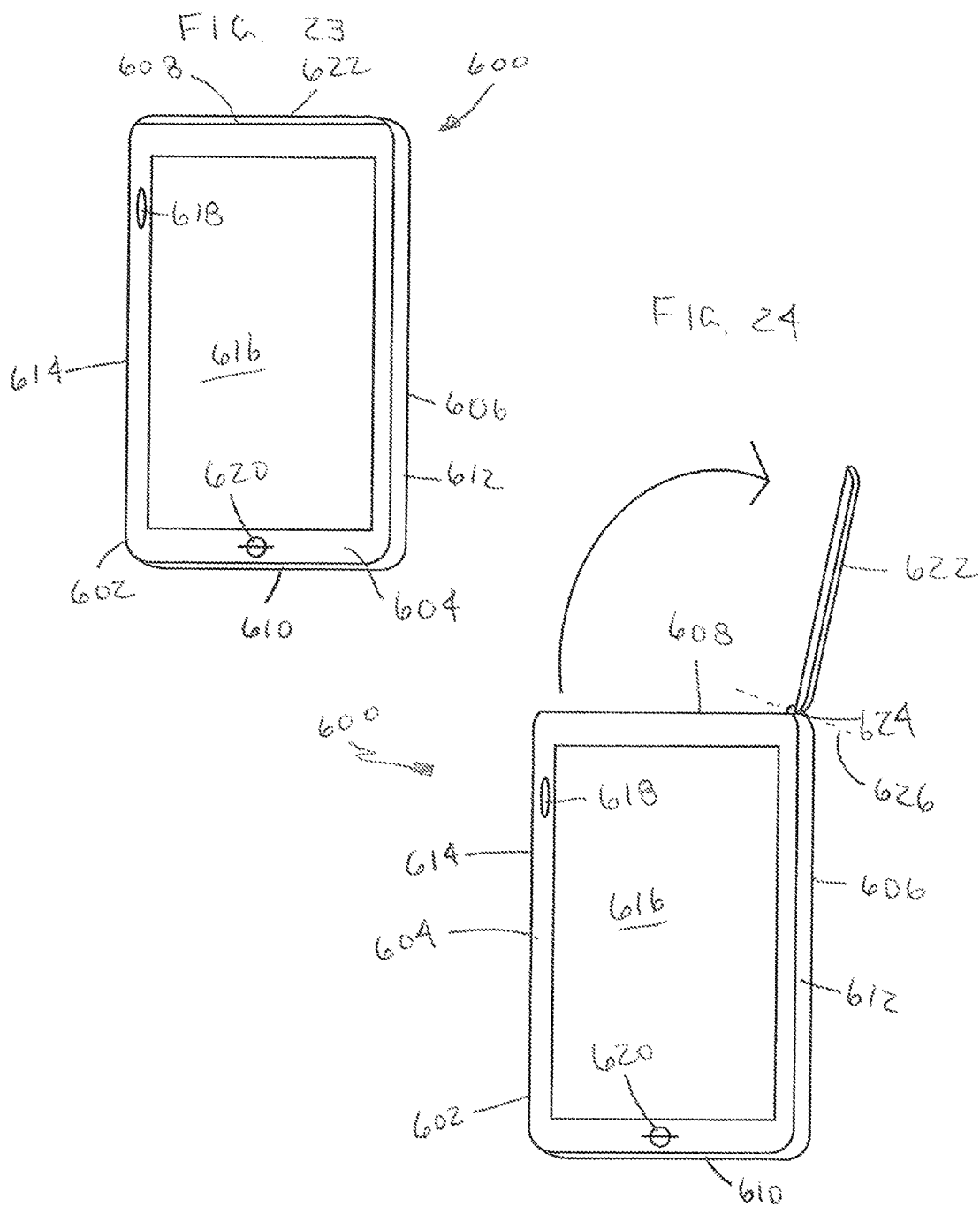

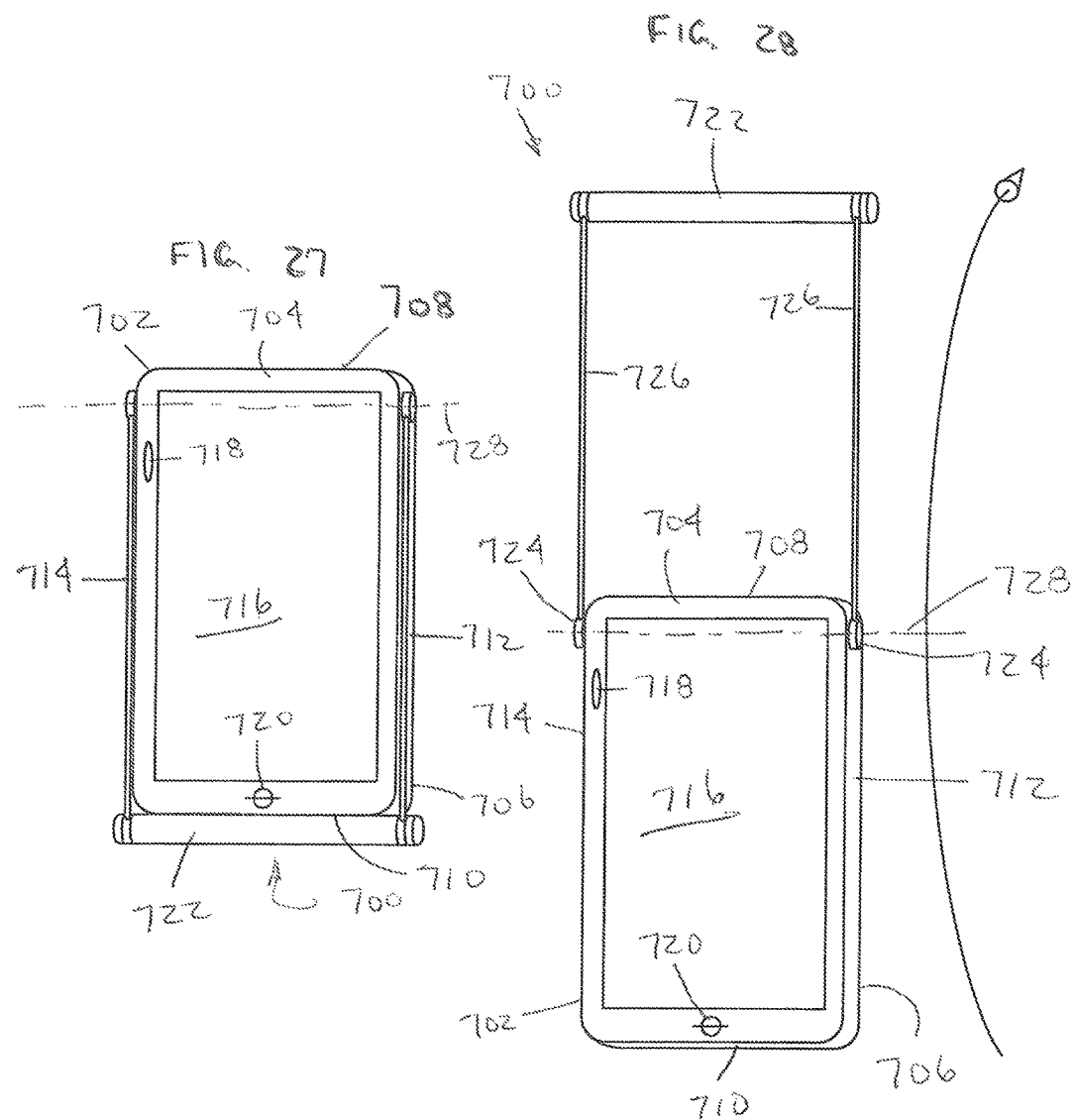

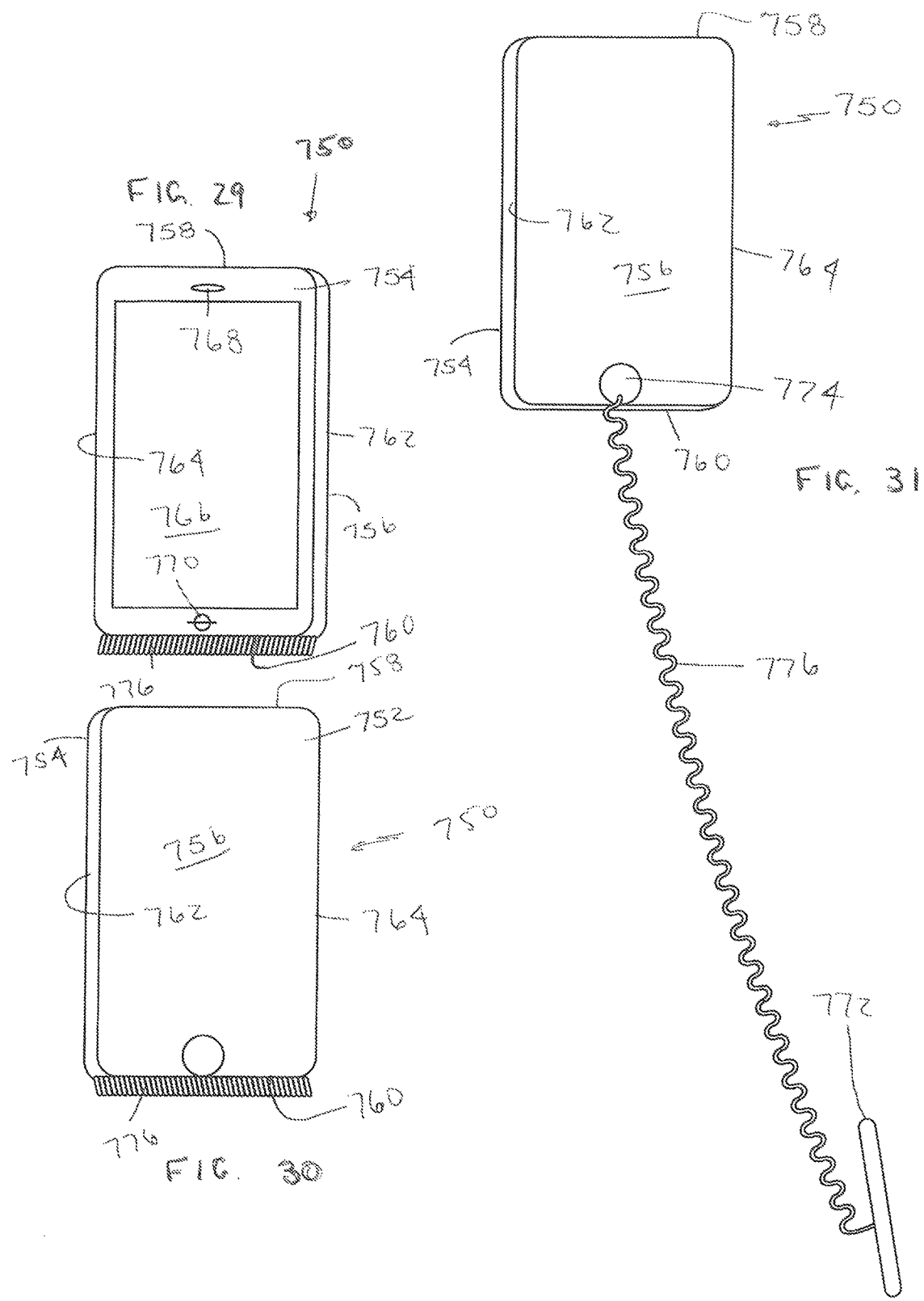

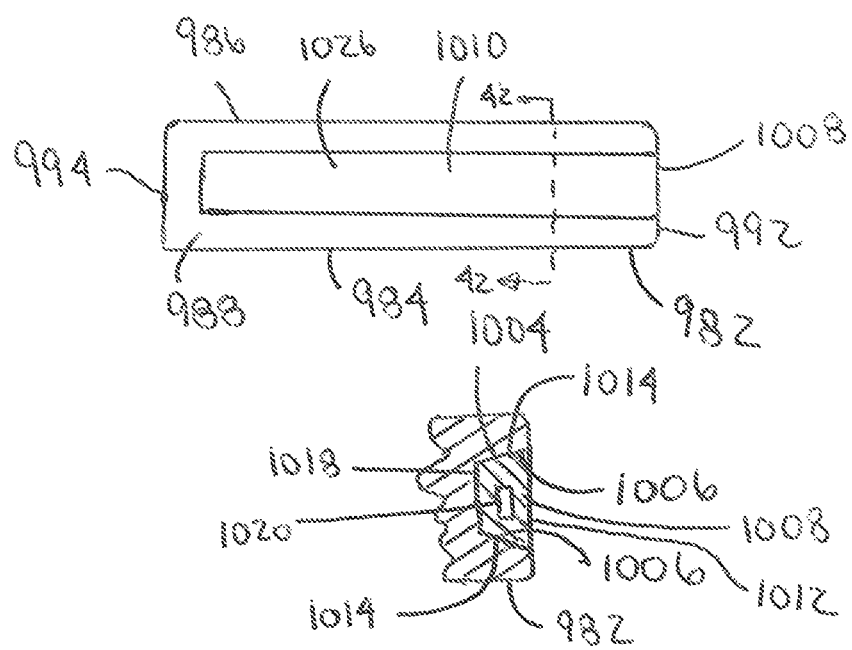
FIG. 40
FIG. 41
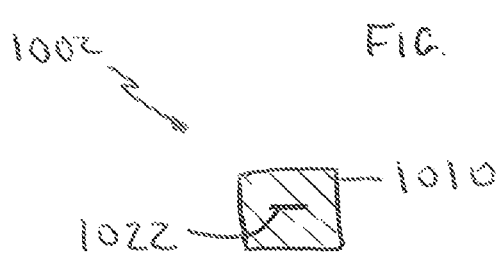
FIG. 42

US 10,389,014 B2

ANTENNA CONFIGURATION FOR MOBILE COMMUNICATION DEVICE

CROSS-REFERENCE TO RELATED APPLICATIONS

This application claims the benefit of priority to U.S. Provisional Patent Application No. 62/281,540, filed on Jan. 21, 2016, U.S. Provisional Patent Application No. 62/288,587, filed on Jan. 29, 2016, and U.S. Provisional Patent Application No. 62/294,384, filed on Feb. 12, 2016, which are hereby incorporated by reference in their entirety.

TECHNICAL FIELD

This disclosure relates to antennas for mobile communication devices.

BACKGROUND

A conventional configuration for an antenna of a mobile communication device is to position the antenna along a back and near the top of the mobile communication device, internal to the mobile communication device. If the antenna is positioned near the top of the mobile communication device and the device is held near an ear of a user, RF radiation enters the head of the user, including the brain and eye tissues of the user.

SUMMARY

This disclosure provides a mobile communication system comprising a mobile communication device, and a separable external antenna. The mobile communication device includes a device connector and is configured to transmit electrical signals to and receive electrical signals from the device connector. The separable external antenna is electrically connected to an antenna connector. The device connector is sized and dimensioned to mate with the antenna connector.

This disclosure also provides a mobile communication device comprising a housing, a hinge, a plate, and an antenna. The housing includes a front face and a back face, and a plurality of sides extending between the front face and the back face. The hinge is attached to the back face of the housing. The plate is rotatably connected to the housing by the hinge at a proximate end of the plate. The antenna is positioned on a distal end of the rotatable plate.

This disclosure also provides a mobile communication device comprising a housing, a strap, a wire, and an antenna. The housing includes a front face and a back face, and a plurality of sides extending between the front face and the back face. The strap is attached to the housing. The wire is positioned on the strap. The antenna is positioned on the strap and the antenna is configured to receive signals from the mobile communication device by way of the wire.

This disclosure also provides a mobile communication system comprising a mobile communication device and an antenna. The mobile communication device includes a device connector positioned on a retractable wire. The mobile communication device is configured to transmit electrical signals to and receive electrical signals from the device connector. The antenna is electrically connected to an antenna connector, and the device connector is sized and dimensioned to mate with the antenna connector.

Advantages and features of the embodiments of this disclosure will become more apparent from the following detailed description of exemplary embodiments when viewed in conjunction with the accompanying drawings.

BRIEF DESCRIPTION OF THE DRAWINGS

FIG. 11 shows a perspective view of a mobile communication device in accordance with an exemplary embodiment of the present disclosure.

FIG. 12 shows a perspective view of a mobile communication device in accordance with another exemplary embodiment of the present disclosure.

FIG. 13 shows a perspective view of a mobile communication device in accordance with a further exemplary embodiment of the present disclosure with a strap and antenna in a first position.

FIG. 14 shows a perspective view of the mobile communication device of FIG. 13 with a strap and antenna in a second position.

FIG. 15 shows a perspective view of a mobile communication device in accordance with a still further exemplary embodiment of the present disclosure.

FIG. 16 shows a perspective view of the mobile communication device of FIG. 15 with an antenna of the mobile communication device in a raised position.

FIG. 17 shows a perspective view of a mobile communication device in accordance with an even further exemplary embodiment of the present disclosure.

FIG. 18 shows a perspective view of the mobile communication device of FIG. 17 with an antenna of the mobile communication device in a raised position.

FIG. 19 shows a perspective view of a mobile communication device in accordance with still another exemplary embodiment of the present disclosure.

FIG. 20 shows a perspective view of the mobile communication device of FIG. 19 with an antenna of the mobile communication device in a raised position.

FIG. 21 shows a perspective view of a mobile communication device in accordance with yet still another exemplary embodiment of the present disclosure with an antenna in a first position.

FIG. 22 shows a perspective view of the mobile communication device of FIG. 21 with the antenna of the mobile communication device in a second position.

FIG. 23 shows a perspective view of a mobile communication device in accordance with yet an even further exemplary embodiment of the present disclosure with an antenna in a first position.

FIG. 24 shows a perspective view of the mobile communication device of FIG. 23 with an antenna of the mobile communication device in a second position.

FIG. 27 shows a perspective view of a mobile communication device in accordance with still yet another exemplary embodiment of the present disclosure with an antenna in a first position.

FIG. 28 shows a perspective view of the mobile communication device of FIG. 27 with an antenna of the mobile communication device in a second position.

FIG. 29 shows a first perspective view of a mobile communication device in accordance with another further exemplary embodiment of the present disclosure with an antenna in a first position.

FIG. 30 shows a second perspective view of the mobile communication device of FIG. 29.

FIG. 31 shows a view of the mobile communication device of FIG. 30 with an antenna of the mobile communication device in a second position.

FIG. 40 shows a view of a top or end of the mobile communication device of FIG. 38.

FIG. 41 shows a sectional view of the mobile communication device of FIG. 39 along the lines 41-41.

FIG. 42 shows a sectional view of the mobile communication device of FIG. 39 along the lines 42-42.

DETAILED DESCRIPTION

Figure 1:
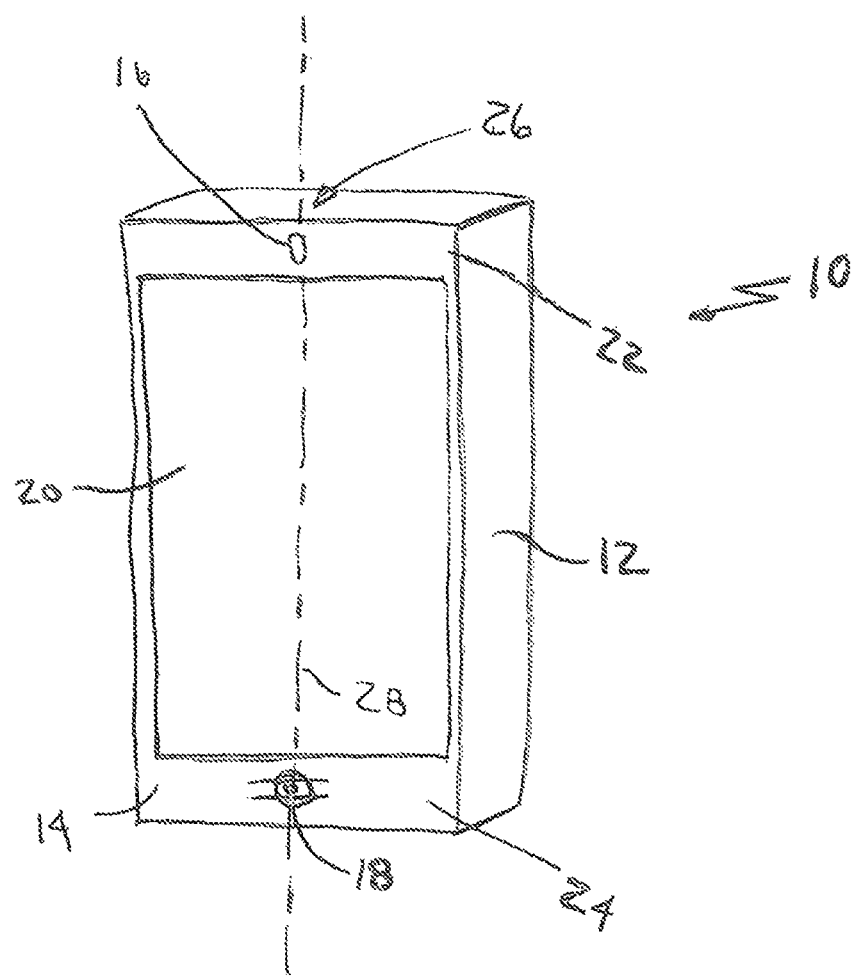
FIG. 1 shows a perspective view of a conventional mobile communication device.
Figure 2:
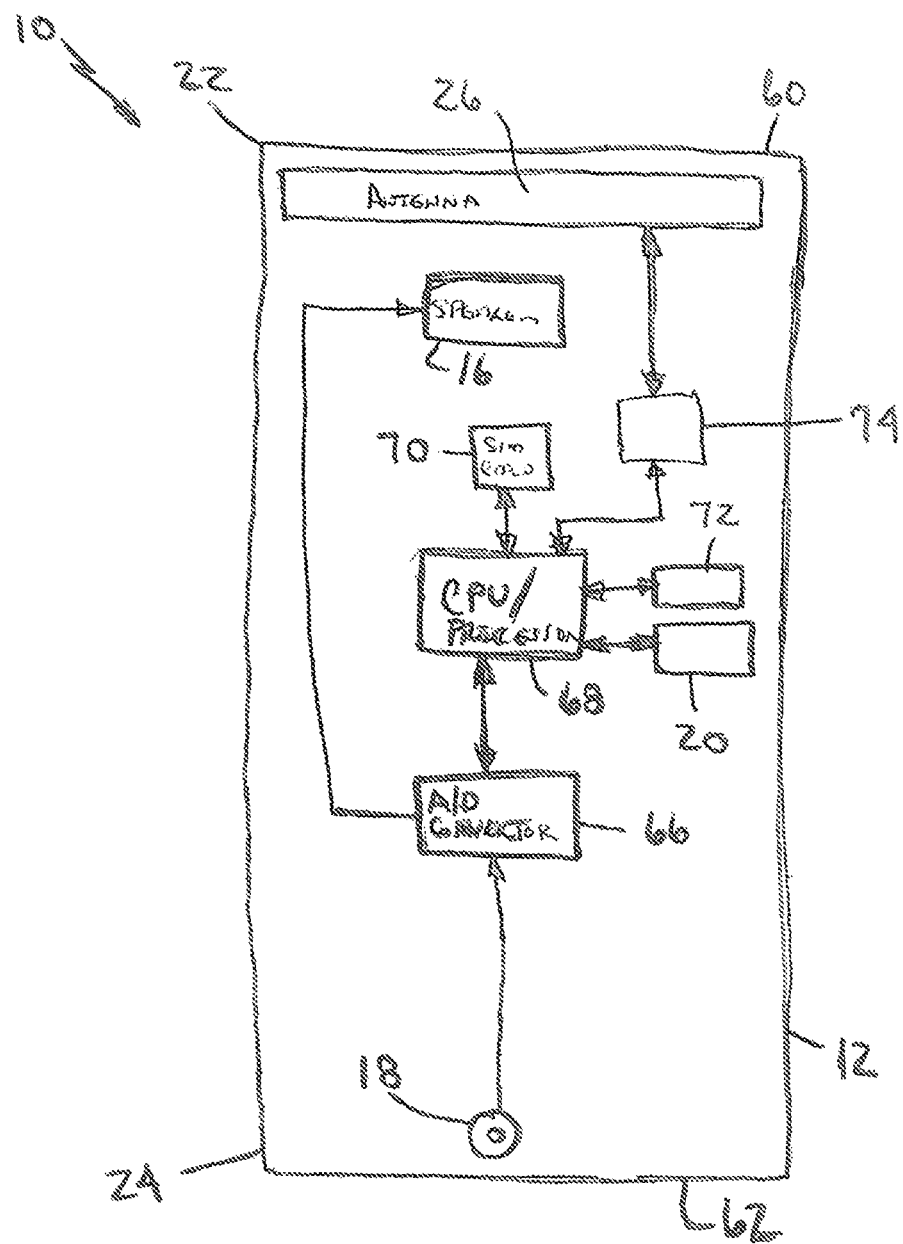
FIG. 2 shows a block diagram of the conventional mobile communication device of FIG. 1.

Mobile communication devices share common features. Referring to FIGS. 1 and 2, a conventional mobile communication device, indicated generally at 10, includes a housing or case 12 configured to contain and/or support various elements of mobile communication device 10. Housing 12 includes a front face 14, and located in or on front face 14 is a speaker 16, a microphone 18, and a display 20 positioned longitudinally between speaker 16 and microphone 18. Generally, the end or location of mobile communication device 10 where speaker 16 is located is considered a top 22 of mobile communication device 10, and thus is also the top of housing 12, and the end or location of mobile communication device 10 where microphone 18 is located is considered a bottom 24 of mobile communication device 10, and thus is also the bottom of housing 12. Speaker 16 and microphone 18 are located near a longitudinal centerline 28 to position speaker 16 near an ear of the user and to position microphone near a mouth of the user when mobile communication device 10 is positioned on or near a face of a user. Mobile communication device 10 further includes an antenna 26 for wireless communication. Antenna 26 is positioned at least partially at or near top 22, with at least a portion of antenna 26 being internal to housing 12 of mobile communication device 10. It should be noted that some mobile communication devices may use a portion of a casing or housing to form an antenna. Accordingly, a conventional antenna for a mobile communication device may include a portion that is on an outside of a casing or housing. However, such antennas are collocated with the mobile communication device and can thus be considered as part of the mobile communication device. Thus, in any location in this disclosure where an internal antenna is referenced, such language should be considered to include an antenna positioned on or in a casing of the mobile communication device, or partially within and partially outside of a casing of the mobile communication device.

While conventional mobile communication devices 10 work well for their intended purpose, antenna 26 transmits radio frequency (RF) energy, and it is believed that exposure to RF energy may lead to tissue damage and potentially cancer, possibly due to heating of brain and eye tissues and interaction of RF energy with cells. The embodiments of the present disclosure provide positions of an antenna of a mobile communication device in a location that places the antenna at a spaced distance from a user and/or the brain and eyes of the user to reduce the amount of RF energy that impinges on the brain and eyes of the user when the mobile communication device is in use and held near the face of a user.

FIG. 2 shows a block diagram of mobile communication device 10. As noted hereinabove, casing or housing 12 is configured to contain various internal elements of mobile communication device 10. Positioned in housing 12 is speaker 16, microphone 18, and display 20 positioned longitudinally between speaker 16 and microphone 18. Mobile communication device 10 also includes an analog-to-digital (A/D) converter 66, a processor 68, a sim card 70, a non-transient memory 72, and a transceiver 74, each of which operates in a conventional manner. It should be understood that mobile communication devices include a variety of configurations. For example, the functions of a transceiver, which include conversion of signals received from a processor to RF signals suitable for antenna transmission, may be spread over a plurality of elements.

Many aspects of the disclosure are described in terms of sequences of actions to be performed by elements of a computer system or other hardware capable of executing programmed instructions, for example, a general-purpose computer, special purpose computer, workstation, or other programmable data process apparatus. It will be recognized that in each of the embodiments, the various actions could be performed by specialized circuits (e.g., discrete logic gates interconnected to perform a specialized function), by program instructions (software), such as program modules, being executed by one or more processors (e.g., one or more microprocessors, a central processing unit (CPU), and/or application specific integrated circuit), or by a combination of both. For example, embodiments can be implemented in hardware, software, firmware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units that perform particular functions. It should be understood that these modules and units are merely described based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including, but not limited to, keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Figure 3:
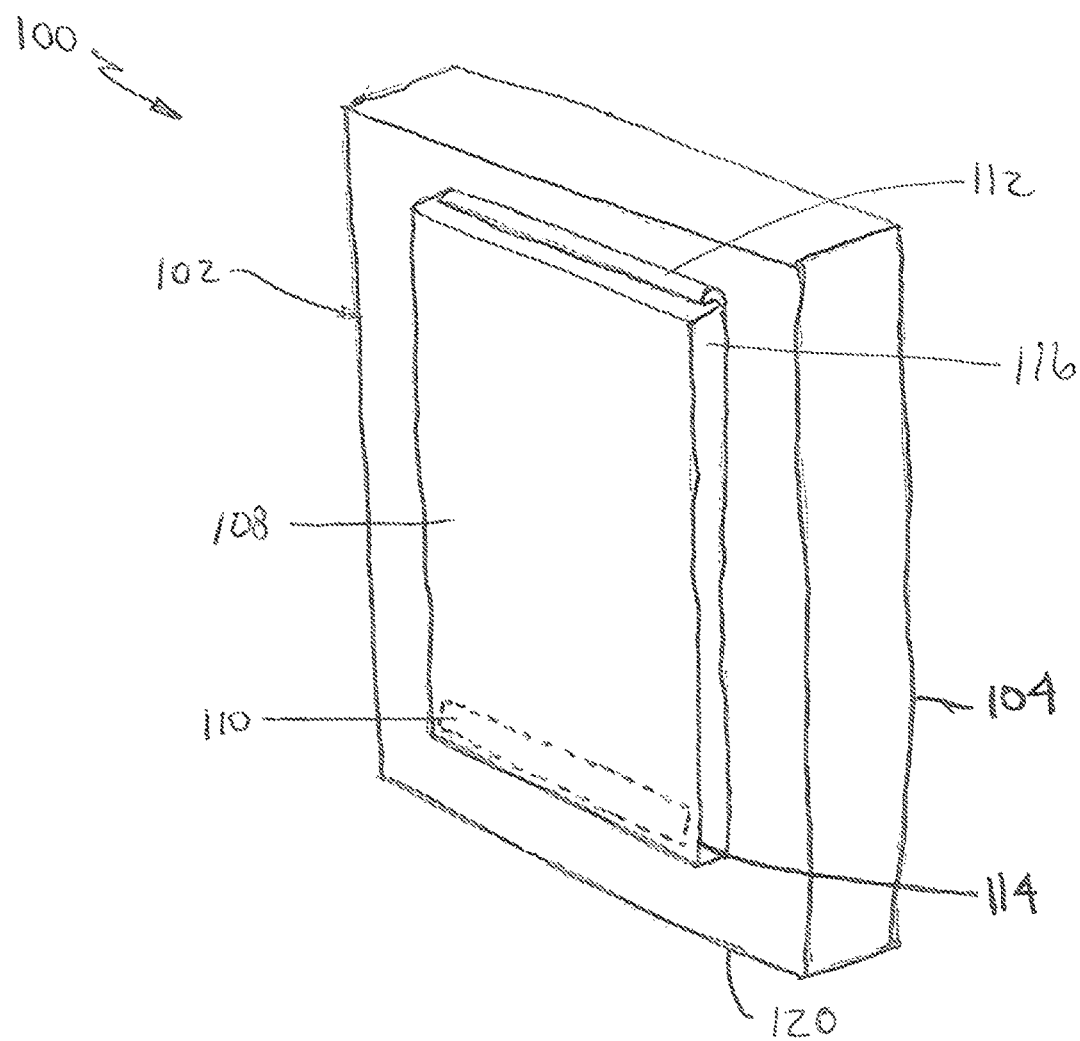
FIG. 3 shows a perspective view of a mobile communication device in accordance with an exemplary embodiment of the present disclosure.
Figure 4:
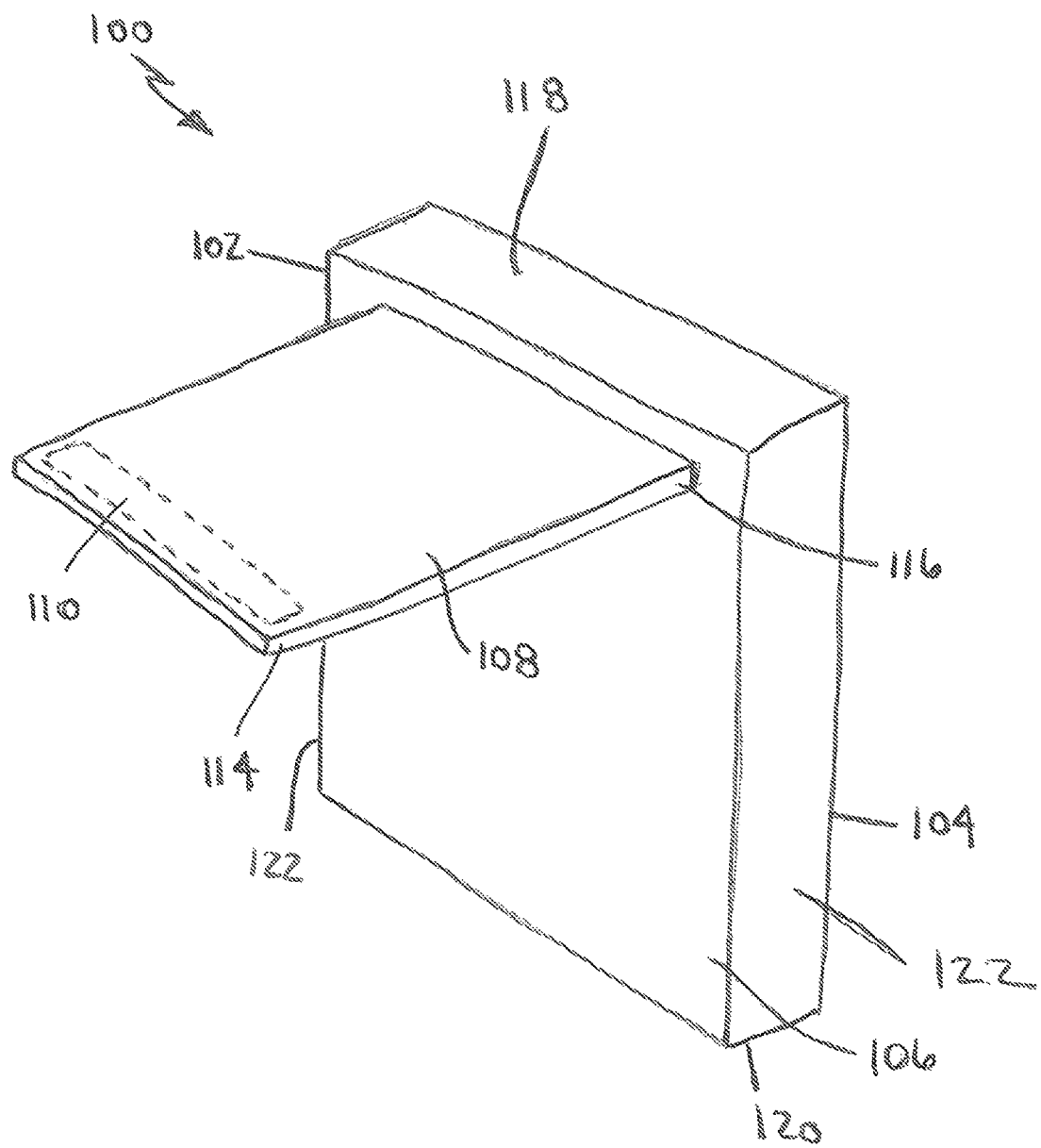
FIG. 4 shows a perspective view of the mobile communication device of FIG. 3 with an antenna positioned in a raised or extended position.

FIGS. 3 and 4 show perspective views of a mobile communication device, shown generally at 100, in accordance with an exemplary embodiment of the present disclosure. Mobile communication device 100 includes a housing or casing 102, which includes a front face 104 and a back face 106. Front face is configured to include a speaker, a microphone, and a display, which can be disposed in a configuration similar to that of FIGS. 1 and 2.

Mobile communication device 100 further includes a rotatable or movable plate 108 positioned and movably mounted on back face 106. Movable plate 108 includes a distal end 114 which is configured to include an antenna 110, and a proximate end 116. Proximate end 116 locates a hinge 112 that is configured to connect movable plate 108 to housing or casing 102 rotatably and movably, and is configured to include electrical connection between an interior of mobile communication device 100 and antenna 110. Antenna 110 is typically positioned internal to movable plate 108 and is positioned as close to distal end 114 as possible. In addition, movable plate 108 is preferably as long as possible, including being equal in length to housing or casing 102 and being longer than housing or casing 102, which could be accomplished by a double folding plate, each of which could be about the length of housing or casing 102. When movable plate 108 is rotated to the position shown in FIG. 4, antenna 110 is positioned a spaced distance from front face 104, such spaced distance being at least a thickness of housing or casing 102 and nearly the entire length of movable plate 108. The direction of rotation of movable plate 108 can be described as rotation in a direction that is toward a top 118 of housing or casing 102, rotation in a direction that is away from a bottom 120 of housing or casing 102, and rotation in a plane that is parallel to a plurality of sides 122 of housing or casing 102 that extend between top 118 and bottom 120 of housing or casing 102.

Figure 5:
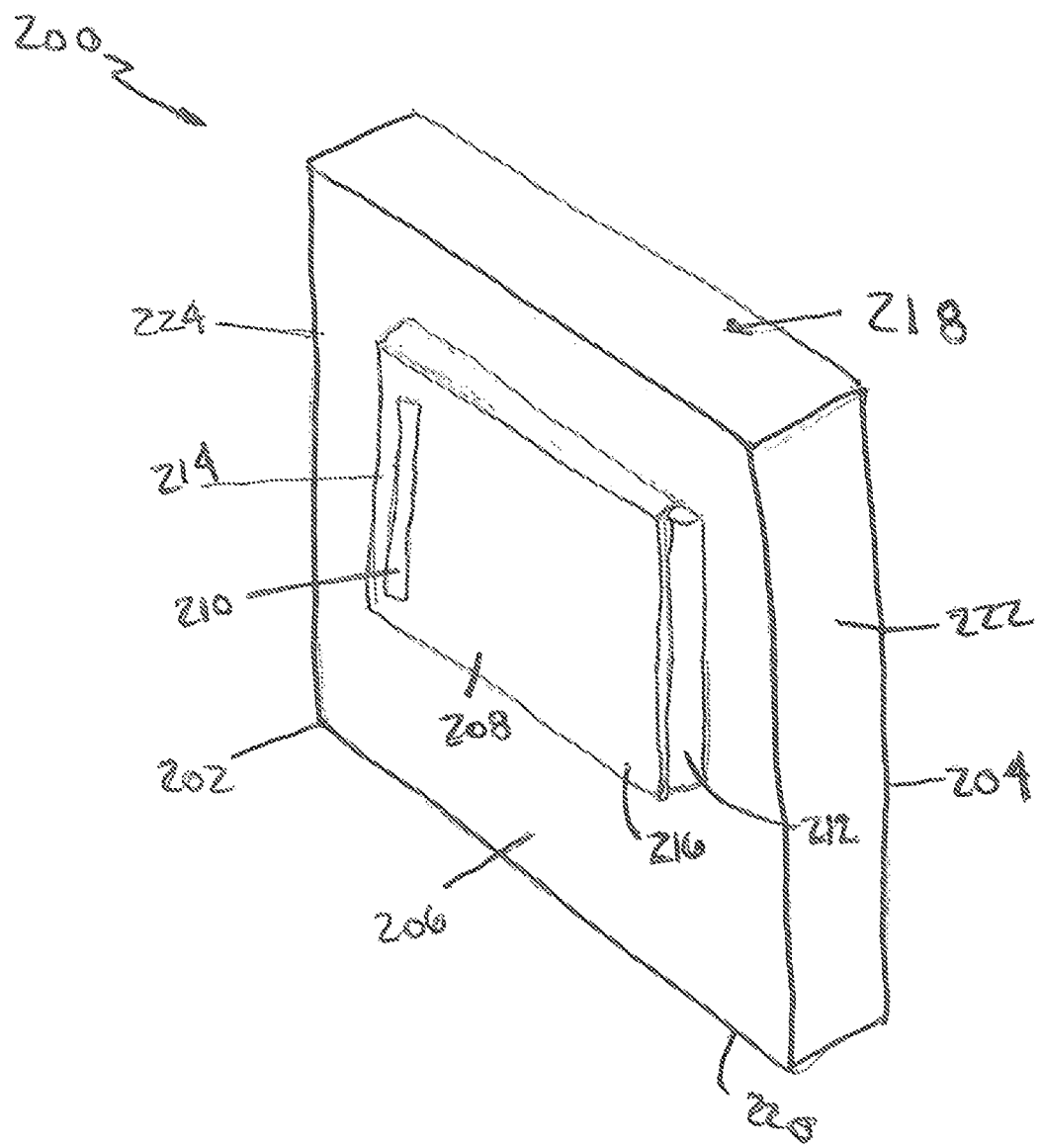
FIG. 5 shows a perspective view of a mobile communication device in accordance with another exemplary embodiment of the present disclosure.
Figure 6:
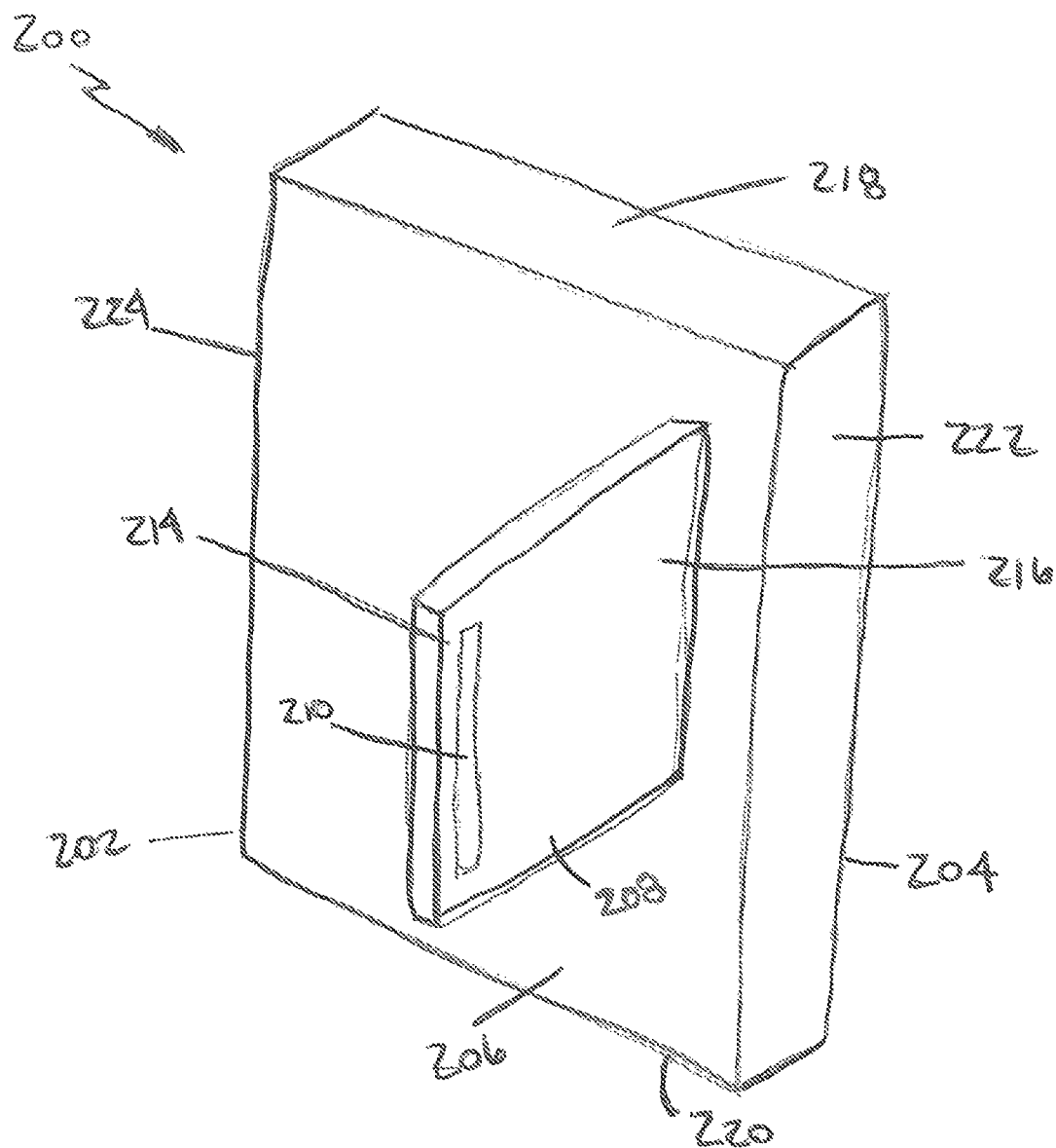
FIG. 6 shows a perspective view of the mobile communication device of FIG. 5 with an antenna positioned in a raised or extended position.

FIGS. 5 and 6 show perspective views of a mobile communication device, shown generally at 200, in accordance with an exemplary embodiment of the present disclosure. Mobile communication device 200 includes a housing or casing 202, which includes a front face 204 and a back face 206. Front face is configured to include a speaker, a microphone, and a display, which can be disposed in a configuration similar to that of FIGS. 1 and 2.

Mobile communication device 200 further includes a rotatable or movable plate 208 positioned and movably mounted on back face 206. Movable plate 208 includes a distal end 214 which is configured to include an antenna 210, and a proximate end 216. Proximate end 216 locates a hinge 212 that is configured to connect movable plate 208 to housing or casing 202 rotatably or movably and to provide an electrical connection between antenna 210 and an internal portion of housing or casing 202. Antenna 210 is typically positioned internal to movable plate 208 and is positioned as close to distal end 210 as possible. In addition, movable plate 208 is preferably as long as possible, including being equal in length to a width of housing or casing 202 or being wider than housing or casing 202. When movable plate 208 is rotated to the position shown in FIG. 6, antenna 210 is positioned a spaced distance from front face 204, such spaced distance being at least a thickness of housing or casing 202 and nearly the entire length of movable plate 208. The direction of rotation of movable plate 208 can be described as rotation in a direction that is toward a first side 222 of housing or casing 202 and away from a second side 224 of housing or casing 202. It should be understood that first side 222 can be a left side or a right side of housing or casing 202. Rotation of movable plate 208 is also rotation in a plane that is parallel to a top side 218 and a bottom side 220 of housing or casing 202.

One benefit of the present disclosure can be seen by comparing FIGS. 7-10.

Figure 7:
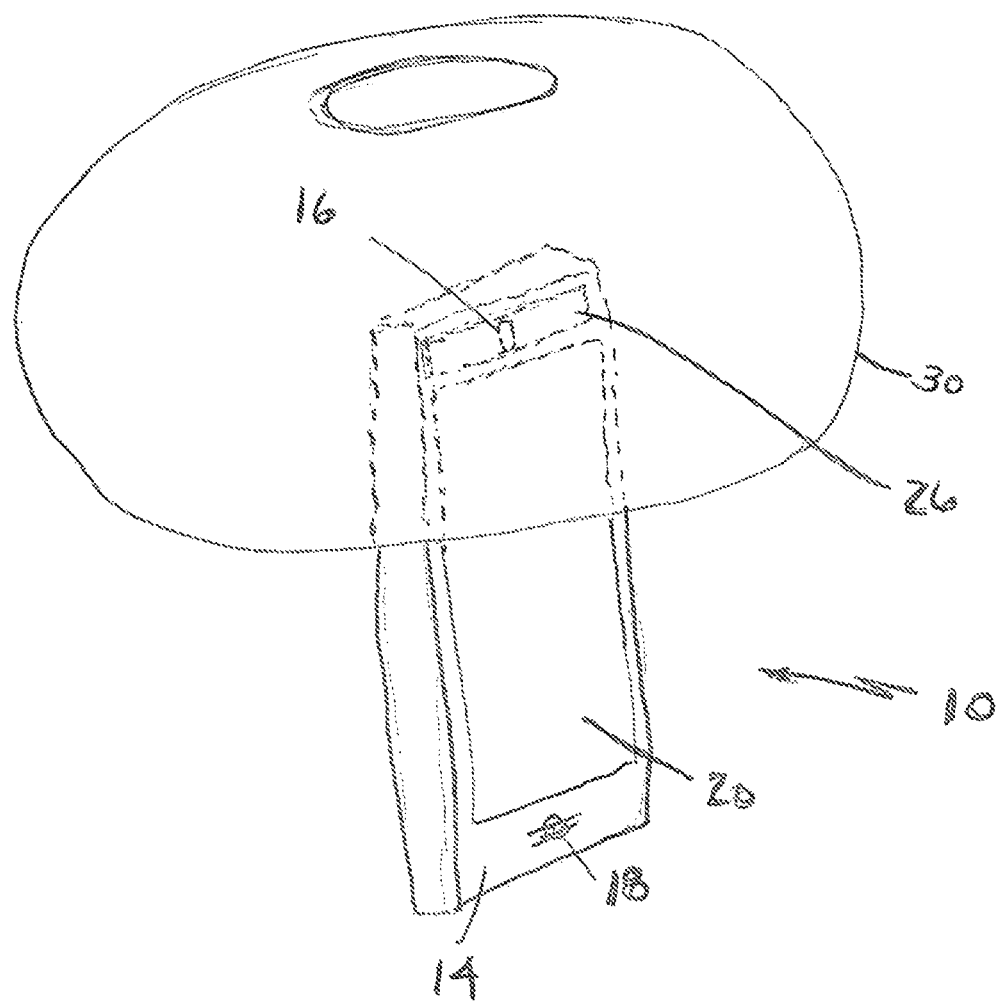
FIG. 7 shows a perspective view of the mobile communication device of FIG. 1 showing an approximate near field radiation pattern of an antenna of the mobile communication device.
Figure 8:
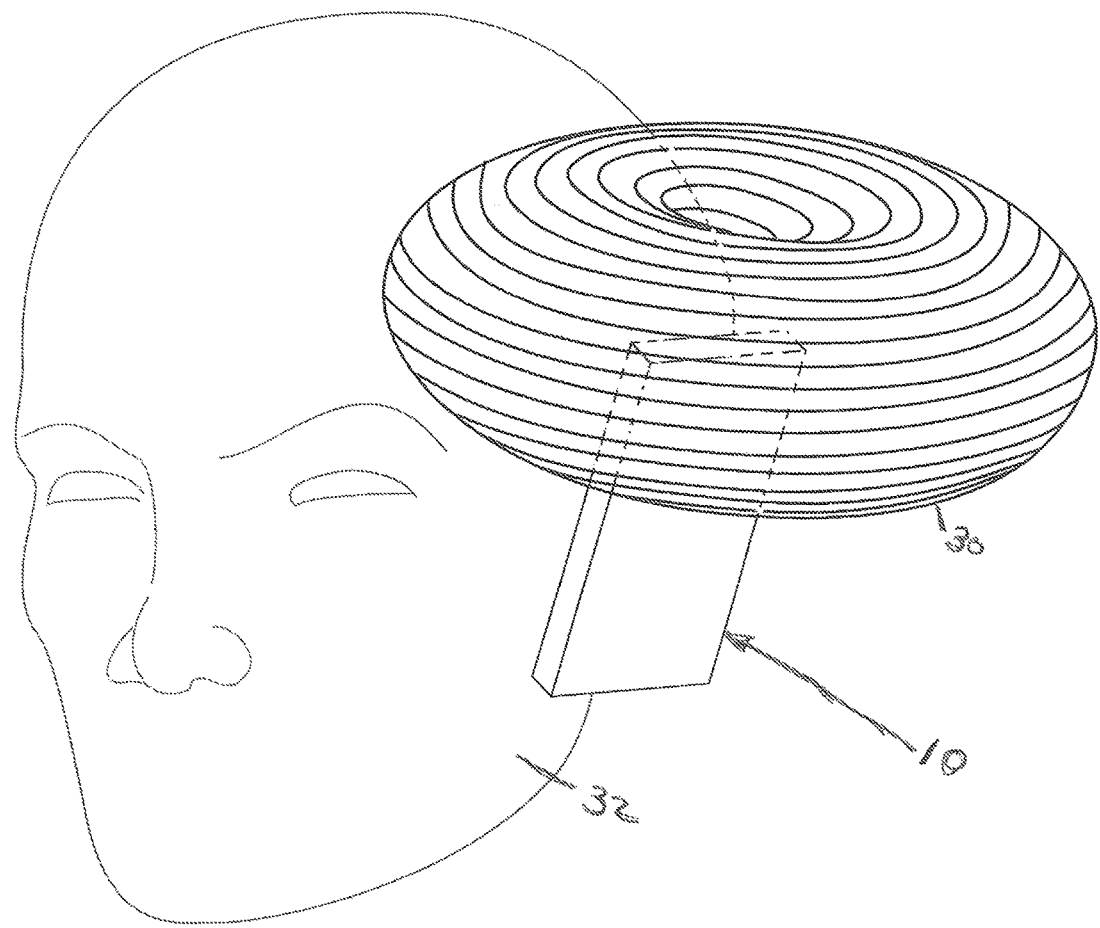
FIG. 8 shows a perspective view of the mobile communication device of FIG. 7 and the approximate near field radiation pattern shown adjacent to a head of a user.

FIG. 7 shows a perspective view of conventional mobile communication device 10 of FIG. 1 showing an approximate near field radiation pattern 30 of an antenna of the mobile communication device. When conventional mobile communication device 10 is positioned near a head 32 of a user, as shown in FIG. 8, radiation pattern 30 intersects with head 32, and interacts with the user's brain.

Figure 9:
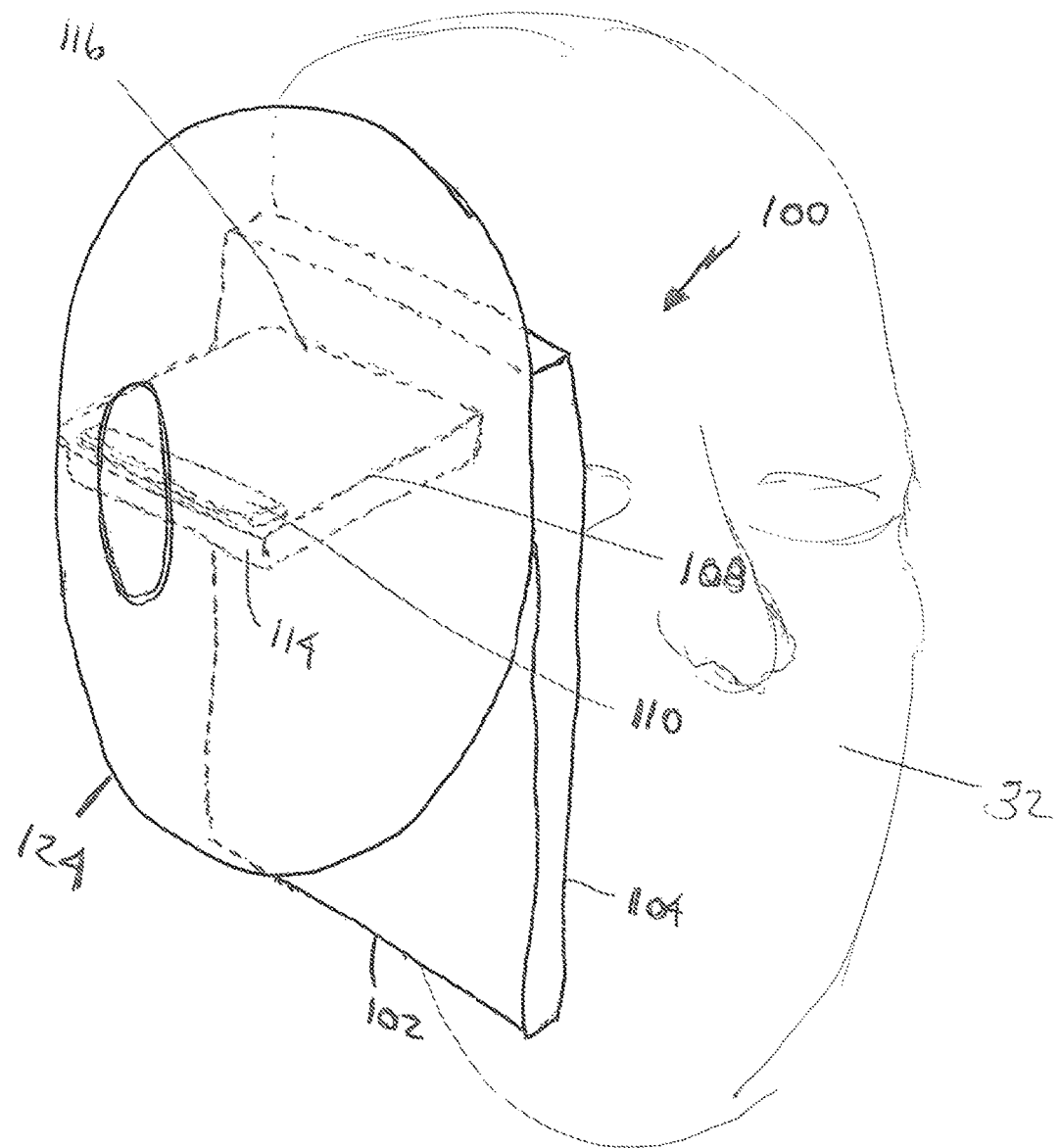
FIG. 9 shows a perspective view of the mobile communication device of FIGS. 3 and 4 with a plate including an antenna in a raised position and showing an approximate near field radiation pattern of the antenna of the mobile communication device.

FIG. 9 shows a perspective view of mobile communication device 100 of FIGS. 3 and 4 with plate 108 including antenna 110 in a raised position and showing an approximate near field radiation pattern 124 of antenna 110. Because radiation pattern 124 is positioned away from front face 104, which could be held close to a head, such as head 32, of the user, the interaction between radiation pattern 124 and the brain in head 32 is decreased, reducing the effect of such radiation on the brain.

Figure 10:
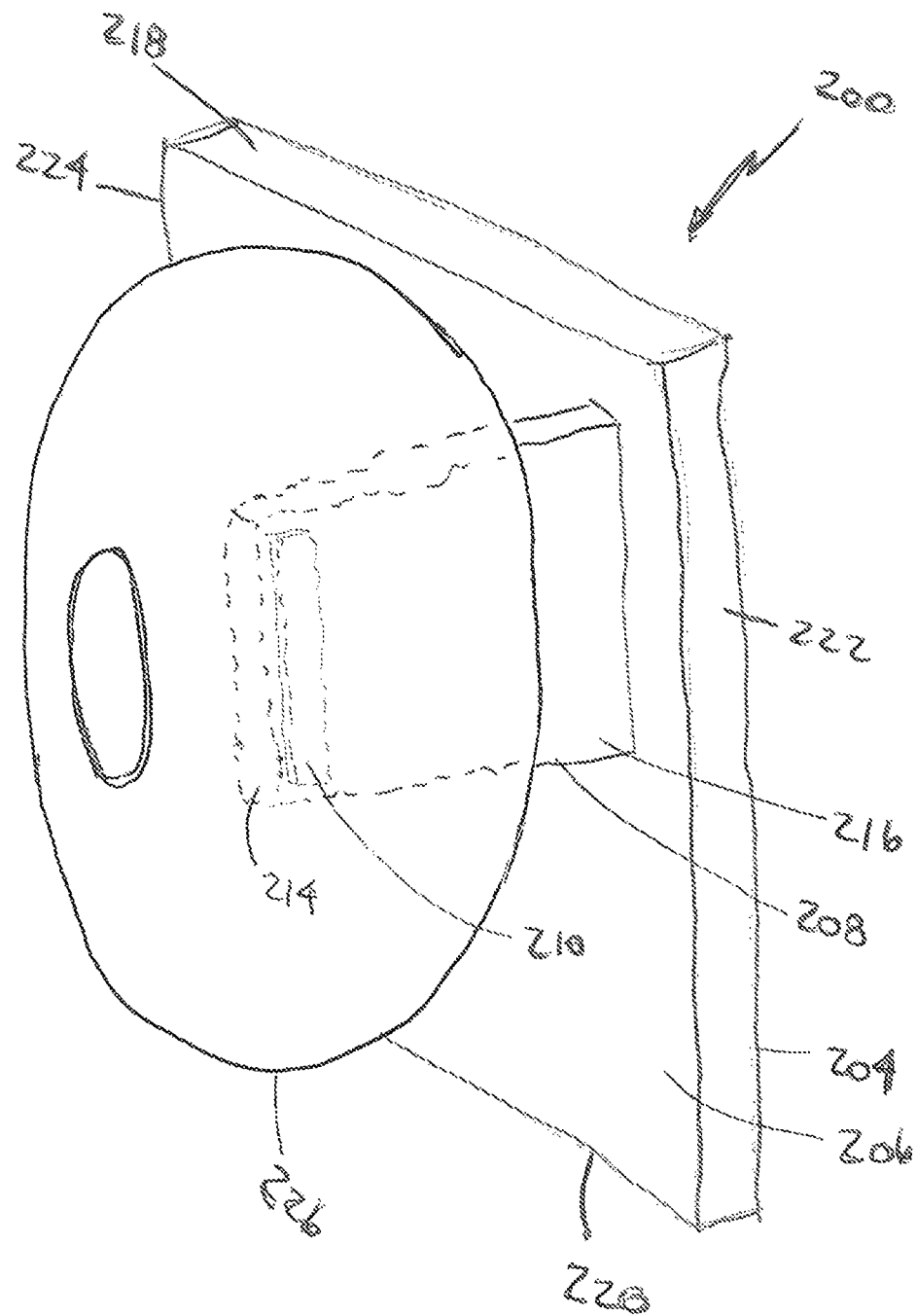
FIG. 10 shows a perspective view of the mobile communication device of FIGS. 5 and 6 with a plate including an antenna in a raised position and showing an approximate near field radiation pattern of the antenna of the mobile communication device.

FIG. 10 shows a perspective view of mobile communication device 200 of FIGS. 5 and 6 with plate 208 including antenna 210 in a raised, extended, or rotated position and showing an approximate near field radiation pattern 226 of antenna 210. Because radiation pattern 226 is positioned away from front face 204, which could be held close to a head, such as head 32, of the user, the interaction between radiation pattern 226 and the brain in head 32 is decreased, reducing the effect of such radiation on the brain. It should be understood that device 200 can include the elements shown in FIG. 2, such as speaker 16 and microphone 18, positioned at any suitable or available position such as the positions shown in FIG. 1, or any position located along longitudinal centerline 28, as well as in any position in any face of device 200 as described in any embodiment of the present disclosure.

FIG. 11 shows a perspective view of a mobile communication device, indicated generally at 250, in accordance with an exemplary embodiment of the present disclosure. Mobile communication device 250 includes a housing or casing 252. Housing or casing 252 includes a front face 254, a back face 256, and a plurality of sides extending between front face 254 and back face 256, including a top side 258, a bottom side 260, a right side 262, and a left side 264. Front face 254 supports and positions a display 266. One of the plurality of sides supports a speaker 268 and a microphone 270. It should be apparent that speaker 268 and microphone 270 can be located on any of sides 258, 260, 262, and 264, as well as front face 254 and back face 256. It should be understood that device 250 can include an arrangement of features such as is shown in FIG. 2, with speaker 16 and microphone 18 positioned at any suitable or available position such as the positions shown in FIG. 1, or any position located along longitudinal centerline 28, as well as in any position in any face of device 250 as described in any embodiment of the present disclosure.

Mobile communication device 250 further includes a strap 272, which supports an antenna 276 and a wire or cable 274 that connects antenna 276 to internal elements positioned in housing or casing 252. Strap 272 is configured to permit a user to position antenna 276 a spaced distance from speaker 268 and microphone 270 to reduce interaction between RF energy generated by antenna 276 and the user's head. Strap 272 can be fixedly attached to casing or housing 252 or can be attached by a swivel 278 that permits rotary movement of strap 272 with respect to housing or casing 252 while maintaining an electrical contact or connection between wire or cable 274 and elements internal to housing or casing 252.

FIG. 12 shows a perspective view of a mobile communication device, indicated generally at 300, in accordance with an exemplary embodiment of the present disclosure. Mobile communication device 300 includes many elements similar to those of FIG. 11. Accordingly, elements that are functionally similar to elements of FIG. 11 are provided the same element number as FIG. 11, and the description of those elements is incorporated into this embodiment. It should be understood that device 300 can include an arrangement of features such as is shown in FIG. 2, with speaker 16 and microphone 18 positioned at any suitable or available position such as the positions shown in FIG. 1, or any position located along longitudinal centerline 28, as well as in any position in any face of device 300 as described in any embodiment of the present disclosure.

Mobile communication device 300 further includes a strap 302, which supports an antenna 306 and a wire or cable 304 that connects antenna 306 to internal elements positioned in housing or casing 252. Strap 302 is configured to permit a user to position antenna 306 a spaced distance, or as far as possible based on the length of strap 302, from speaker 268 and microphone 270 as possible to reduce interaction between RF energy generated by antenna 306 and the user's head. Strap 302 can be fixedly attached to casing or housing 252 at two points. In the exemplary embodiment of FIG. 12, strap 302 is attached to housing or casing 252 by an upper swivel 308, which can be positioned on top side 258, and a lower swivel 310, which can be positioned on bottom side 260. At least one of upper swivel 308 and lower swivel 310 permit rotary movement of strap 272 with respect to housing or casing 252 while maintaining an electrical contact or connection between wire or cable 304 and elements internal to housing or casing 252.

FIGS. 13 and 14 show perspective views of a mobile communication device, indicated generally at 350, in accordance with a further exemplary embodiment of the present disclosure. Mobile communication device 350 includes many elements similar to those of FIG. 11. Accordingly, elements that are functionally similar to elements of FIG. 11 are provided the same element number as FIG. 11, and the description of those elements is incorporated into this embodiment.

Mobile communication device 350 further includes a strap 352, which supports an antenna 356 and a wire or cable 354 that connects antenna 356 to internal elements positioned in housing or casing 252. Strap 352 is configured to permit a user to position antenna 356 a spaced distance, or as far as possible based on the length of strap 352, from speaker 268 and microphone 270 as possible to reduce interaction between RF energy generated by antenna 356 and the user's head when mobile communication device 350 is in use, as shown in FIG. 14. Strap 352 can be attached to casing or housing 252 at two points. In the exemplary embodiment of FIGS. 13 and 14, strap 352 is attached to housing or casing 252 by an upper attachment 358, which may be fixed or may swivel and which can be positioned on top side 258, and a lower attachment 360, which can be positioned on bottom side 260. At least one of upper attachment 358 and lower attachment 360 is configured to provide an electrical connection between wire 354 and elements internal to housing or casing 252. In addition, lower attachment 360 is configured to support strap 352 slidably such that strap 352 can be positioned away from mobile communication device 350 during use of mobile communication device 350 and can then be moved toward mobile communication device 350 when device 350 is not in use. Strap 352 can be semi-rigid or flexibly rigid along the entirety of its length, or strap 352 can include a semi-rigid or rigid portion 362 for slidable engagement with lower attachment 360, which includes an opening 364 through which strap 352 slides. While the connection between strap 352 and upper attachment 358 is shown as being fixed, it should be apparent that upper attachment 358 can be configured to maintain electrical contact between wire or cable 354 and elements internal to housing or casing 252 while slidably supporting strap 352.

FIGS. 15 and 16 show perspective views of a mobile communication device, indicated generally at 400, in accordance with a still further exemplary embodiment of the present disclosure. Mobile communication device 400 includes a housing or casing 402. Housing or casing 402 includes a front face 404, a back face 406, and a plurality of sides extending between front face 404 and back face 406, including a top side 408, a bottom side 410, a right side 412, and a left side 414. Front face 404 supports and positions a display 416. In this embodiment, front face 404 supports a speaker 418 and a microphone 420. However, speaker 418 and microphone 420 can be positioned at any suitable or available position on housing or casing 402, such as any of sides 408, 410, 412, and 414, as well as back face 406. Speaker 418 and microphone 420 can be positioned at any suitable or available position such as the positions shown in FIG. 1 for speaker 16 and microphone 18, any position located along centerline 28, as well as any position in any face of device 400 as described in any embodiment of the present disclosure.

Mobile communication device 400 further includes an antenna 422. Antenna 422 is telescopingly positioned or mounted in housing or casing 402 by a telescoping mount 424 to permit positioning antenna 422 as far from the user's brain as telescoping mount 424 will permit. When antenna 422 is retracted, as shown in FIG. 14, antenna 422 can be configured to be conformal with housing or casing 402, and can thus appear to be part of housing or casing 402.

FIGS. 17 and 18 show perspective views of a mobile communication device, indicated generally at 450, in accordance with an even further exemplary embodiment of the present disclosure. Mobile communication device 450 includes a housing or casing 452. Housing or casing 452 includes a front face 454, a back face 456, and a plurality of sides extending between front face 454 and back face 456, including a top side 458, a bottom side 460, a right side 462, and a left side 464. Front face 454 supports and positions a display 466. In this embodiment, front face 454 supports a speaker 468 and a microphone 470. However, speaker 468 and microphone 470 can be positioned at any suitable or available position on housing or casing 452, such as any of sides 458, 460, 462, and 464, as well as back face 456. Speaker 418 and microphone 420 can be positioned at any suitable or available position such as the positions shown in FIG. 1 for speaker 16 and microphone 18, any position located along centerline 28, as well as any position in any face of device 400 as described in any embodiment of the present disclosure.

Mobile communication device 450 further includes an antenna 472. Antenna 472 is positioned or mounted on or in housing or casing 452 by slides 476 attached to antenna 472. Slides 476 interface with housing or casing 452 by grooves 474 formed in or on housing or casing 452. A wire or cable 478 extends from antenna 472 to elements internal to housing or casing 452. Slides 476 are configured to permit positioning antenna 472 as far from the user's brain as slides 476 will permit. When antenna 472 is retracted, as shown in FIG. 17, antenna 472 can be configured to be conformal with housing or casing 452, and can thus appear to be part of housing or casing 452.

FIGS. 19 and 20 show perspective views of a mobile communication device, indicated generally at 500, in accordance with still another exemplary embodiment of the present disclosure. Mobile communication device 500 includes a housing or casing 502. Housing or casing 502 includes a front face 504, a back face 506, and a plurality of sides extending between front face 504 and back face 506, including a top side 508, a bottom side 510, a right side 512, and a left side 514. Front face 504 supports and positions a display 516. In this embodiment, front face 504 supports a speaker 518 and a microphone 520. However, speaker 518 and microphone 520 can be positioned at any suitable or available position on housing or casing 502, such as any of sides 508, 510, 512, and 514, as well as back face 506. It should be understood that device 500 can include an arrangement of features such as is shown in FIG. 2, with speaker 16 and microphone 18 positioned at any suitable or available position such as the positions shown in FIG. 1, or any position located along longitudinal centerline 28, as well as in any position in any face of device 500 as described in any embodiment of the present disclosure.

Mobile communication device 500 further includes an antenna 522. Antenna 522 is positioned or mounted on or in housing or casing 502 by slides 526 attached to antenna 522. Slides 526 interface with housing or casing 502 by channels 524 formed in or on housing or casing 502. A wire or cable 528 extends from antenna 522 to elements internal to housing or casing 502. Slides 526 are configured to permit positioning antenna 522 as far from the user's brain as slides 526 will permit. When antenna 522 is retracted, as shown in FIG. 19, antenna 522 can be configured to be conformal with housing or casing 502, and can thus appear to be part of housing or casing 502. While similar to the embodiment of FIGS. 17 and 18, this embodiment uses internal channels 524 rather than grooves 474. Such an arrangement may reduce sensitivity of slides 526 to contamination entering channels 524.

FIGS. 21 and 22 show perspective views of a mobile communication device, indicated generally at 550, in accordance with yet still another exemplary embodiment of the present disclosure. Mobile communication device 550 includes a housing or casing 552. Housing or casing 552 includes a front face 554, a back face 556, and a plurality of sides extending between front face 554 and back face 556, including a top side 558, a bottom side 560, a right side 562, and a left side 564. Front face 554 supports and positions a display 566. In this embodiment, front face 554 supports a speaker 568 and a microphone 570. However, speaker 568 and microphone 570 can be positioned at any suitable or available position on housing or casing 552, such as any of sides 558, 560, 562, and 564, as well as back face 556. It should be understood that device 550 can include an arrangement of features such as is shown in FIG. 2, with speaker 16 and microphone 18 positioned at any suitable or available position such as the positions shown in FIG. 1, or any position located along longitudinal centerline 28, as well as in any position in any face of device 550 as described in any embodiment of the present disclosure.

Mobile communication device 550 further includes an antenna 572. Antenna 572 is rotatably or pivotally positioned or mounted on housing or casing 552 and is configured to rotate or pivot about a pivot or rotational axis 574. An electrical connection, which is not visible in FIGS. 21 and 22, exists between antenna 572 and elements internal to housing or casing 552. By pivoting antenna 572 away from speaker 568 and microphone 570, the RF energy emitted by antenna 572 is positioned further from sensitive areas of the user's brain. When antenna 572 is pivoted to a stored or stowed position, as shown in FIG. 21, antenna 522 can be configured to be conformal with housing or casing 552, and can thus appear to be part of housing or casing 552.

FIGS. 23 and 24 show perspective views of a mobile communication device, indicated generally at 600, in accordance with yet an even further exemplary embodiment of the present disclosure. Mobile communication device 600 includes a housing or casing 602. Housing or casing 602 includes a front face 604, a back face 606, and a plurality of sides extending between front face 604 and back face 606, including a top side 608, a bottom side 610, a right side 612, and a left side 614. Front face 604 supports and positions a display 616. In this embodiment, front face 604 supports a speaker 618 and a microphone 620. However, speaker 618 and microphone 620 can be positioned at any suitable or available position on housing or casing 602, such as any of sides 608, 610, 612, and 614, as well as back face 606. It should be understood that device 600 can include the elements shown in FIG. 2, such as speaker 16 and microphone 18, positioned at any suitable or available position such as the positions shown in FIG. 1, or any position located along longitudinal centerline 28, as well as in any position in any face of device 600 as described in any embodiment of the present disclosure.

Mobile communication device 600 further includes an antenna 622. Antenna 622 is rotatably or pivotally positioned or mounted on housing or casing 602 by a hinge 624. Hinge 624 is configured to rotate or pivot about a hinge or rotational axis 626. Rotational axis 626 is oriented in a direction that is approximately perpendicular to front face 604 and to back face 606, and is approximately parallel to each one of top side 608, bottom side 610, right side 612, and left side 614. An electrical connection, which is not visible in FIGS. 23 and 24, exists between antenna 622 and elements internal to housing or casing 602. By pivoting antenna 622 away from speaker 618 and microphone 620, the RF energy emitted by antenna 622 is positioned further from sensitive areas of the user's brain. When antenna 622 is pivoted to a stored or stowed position, as shown in FIG. 23, antenna 622 can be configured to be conformal with housing or casing 602, and can thus appear to be part of housing or casing 602.

Figures 25, 26:
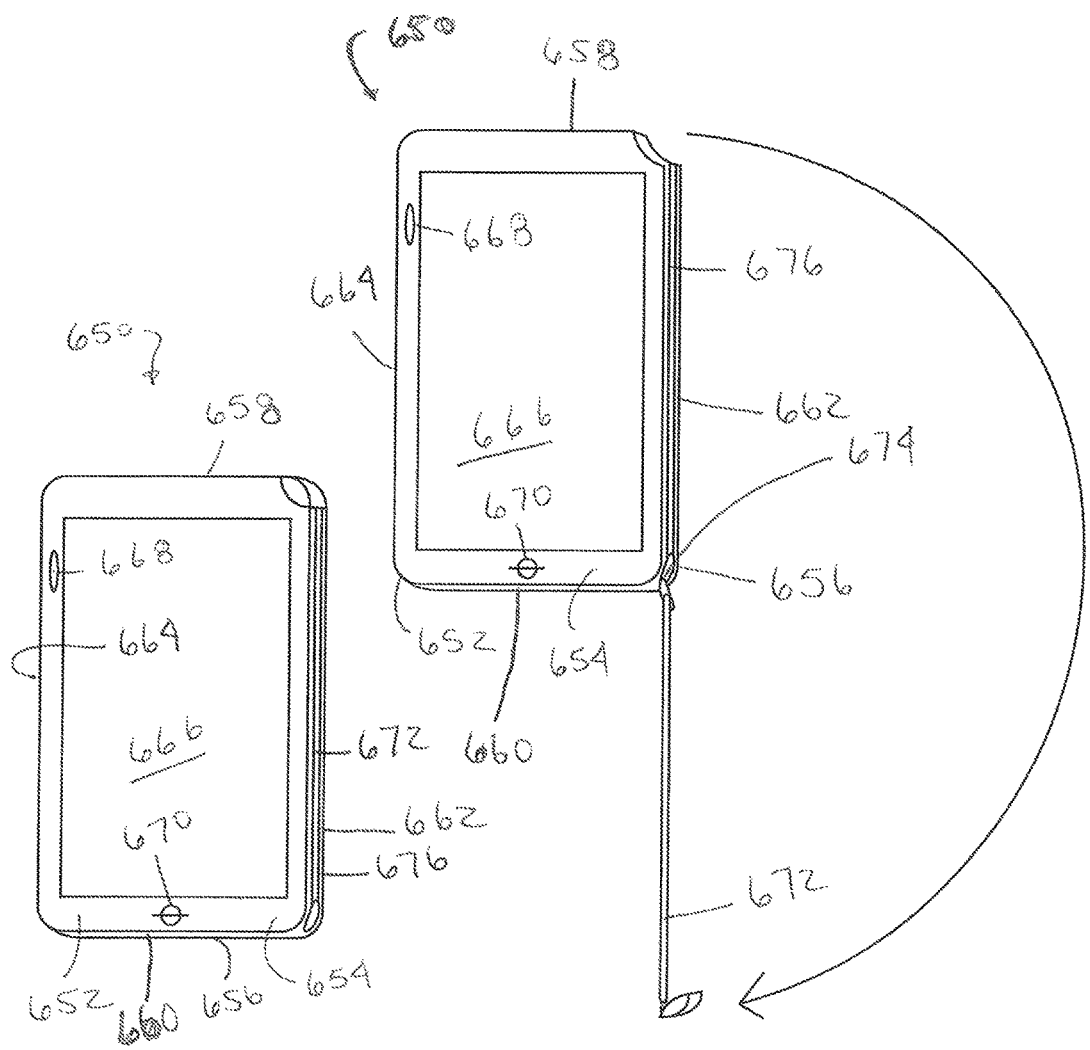
FIG. 25 shows a perspective view of a mobile communication device in accordance with still yet an even further exemplary embodiment of the present disclosure with an antenna in a first position.
FIG. 26 shows a perspective view of the mobile communication device of FIG. 25 with an antenna of the mobile communication device in a second position.

FIGS. 25 and 26 show perspective views of a mobile communication device, indicated generally at 650, in accordance with still yet an even further exemplary embodiment of the present disclosure. Mobile communication device 650 includes a housing or casing 652. Housing or casing 652 includes a front face 654, a back face 656, and a plurality of sides extending between front face 654 and back face 656, including a top side 658, a bottom side 660, a right side 662, and a left side 664. Front face 654 supports and positions a display 666. In this embodiment, front face 654 supports a speaker 668 and a microphone 670. However, speaker 668 and microphone 670 can be positioned at any suitable or available position on housing or casing 652, such as any of sides 658, 660, 662, and 664, as well as back face 656. It should be understood that device 650 can include the elements shown in FIG. 2, such as speaker 16 and microphone 18, positioned at any suitable or available position such as the positions shown in FIG. 1, or any position located along longitudinal centerline 28, as well as in any position in any face of device 650 as described in any embodiment of the present disclosure.

Mobile communication device 650 further includes an antenna 672. Antenna 672 is rotatably or pivotally positioned or mounted on housing or casing 652 by a hinge 674. Hinge 674 is configured to rotate or pivot about a hinge or rotational axis that is oriented in a direction that is approximately perpendicular to front face 654 and to back face 656, and is approximately parallel to each one of top side 658, bottom side 660, right side 662, and left side 664. An electrical connection, which is not visible in FIGS. 25 and 26, exists between antenna 672 and elements internal to housing or casing 652. By pivoting antenna 672 away from speaker 668 and microphone 670, the RF energy emitted by antenna 672 is positioned further from sensitive areas of the user's brain. When antenna 672 is pivoted to a stored or stowed position, as shown in FIG. 25, antenna 672 can be configured to be conformal with housing or casing 652, and can thus appear to be part of housing or casing 652.

FIGS. 27 and 28 show perspective views of a mobile communication device, indicated generally at 700, in accordance with still yet another exemplary embodiment of the present disclosure. Mobile communication device 700 includes a housing or casing 702. Housing or casing 702 includes a front face 704, a back face 706, and a plurality of sides extending between front face 704 and back face 706, including a top side 708, a bottom side 710, a right side 712, and a left side 714. Front face 704 supports and positions a display 716. In this embodiment, front face 704 supports a speaker 718 and a microphone 720. However, speaker 718 and microphone 720 can be positioned at any suitable or available position on housing or casing 702, such as any of sides 708, 710, 712, and 714, as well as back face 706. It should be understood that device 700 can include the elements shown in FIG. 2, such as speaker 16 and microphone 18, positioned at any suitable or available position such as the positions shown in FIG. 1, or any position located along longitudinal centerline 28, as well as in any position in any face of device 700 as described in any embodiment of the present disclosure.

Mobile communication device 700 further includes an antenna 722. Antenna 722 is rotatably or pivotally positioned or mounted on housing or casing 702 by a pair of pivots 724, each of which is disposed on an opposite side from the other, which in the embodiment of FIGS. 27 and 28 are right side 712 and left side 714. Each pivot 724 is configured to rotate or pivot about a pivot or rotational axis 728 that is oriented in a direction that is approximately parallel to front face 704, to back face 706, to top side 708, and to bottom side 710, and is approximately perpendicular to each one of right side 712 and left side 714. Extending between antenna 722 and each pivot 724 is a support 726. A wire or cable extends through at least one support 726 to connect antenna 722 electrically to elements internal to housing or casing 702. By pivoting antenna 722 away from speaker 718 and microphone 720, the RF energy emitted by antenna 722 is positioned further from sensitive areas of the user's brain. When antenna 722 is pivoted to a stored or stowed position, as shown in FIG. 27, antenna 722 can be positioned at a location that is below or on an opposite side of bottom side 710 from display 716.

FIGS. 29-31 show perspective views of a mobile communication device, indicated generally at 750, in accordance with another further exemplary embodiment of the present disclosure. Mobile communication device 750 includes a housing or casing 752. Housing or casing 752 includes a front face 754, a back face 756, and a plurality of sides extending between front face 754 and back face 756, including a top side 758, a bottom side 760, a right side 762, and a left side 764. Front face 754 supports and positions a display 766. In this embodiment, front face 754 supports a speaker 768 and a microphone 770. However, speaker 768 and microphone 770 can be positioned at any suitable or available position on housing or casing 752, such as any of sides 758, 760, 762, and 764, as well as back face 756. Mobile communication device 750 further includes an antenna 772. Antenna 772 is connected to housing or casing 752 by a flexible wire or cable 776. Wire or cable 776 is connected to housing 752 by an attachment or fastener 774. Wire or cable 776 is electrically connected through attachment 774 to elements internal to housing or casing 752. Antenna 772 can be extended away from housing 752 to position antenna 772 a spaced distance from at least speaker 768 and antenna 772, thus also positioning antenna 772, and the RF energy emitted by antenna 772, a spaced distance from the user's head. Attachment or fastener 774 can be configured to be rotatably or pivotally positioned on housing or casing 752, permitting greater ease of movement of antenna 772 with respect to housing 752.

Figure 43:
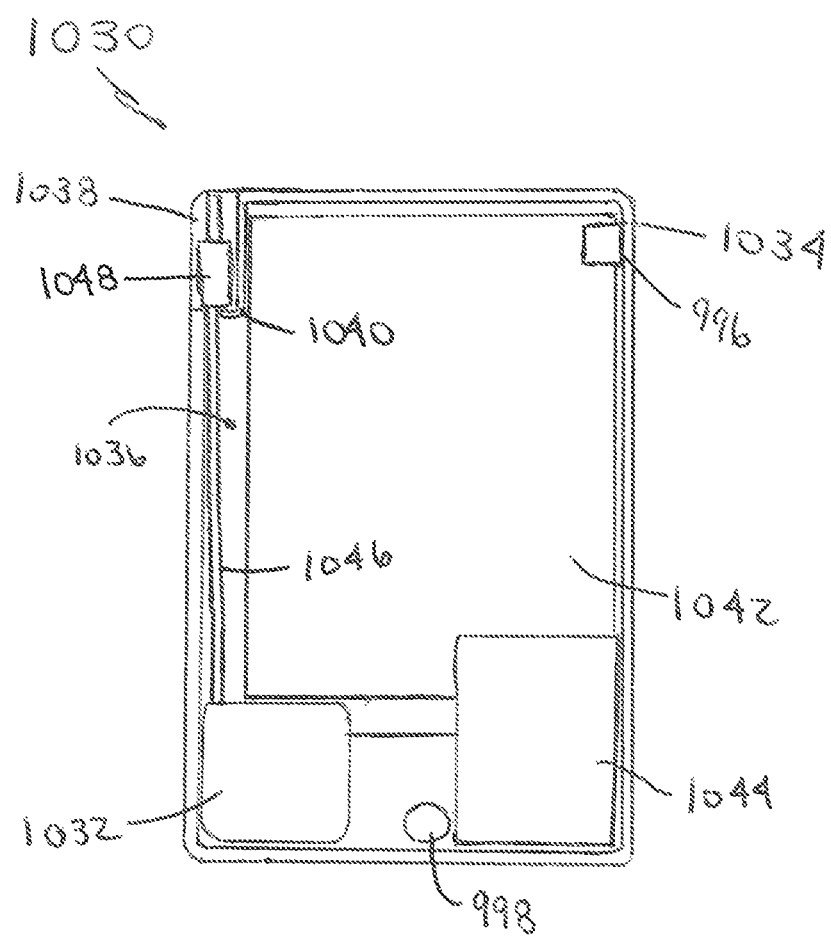
FIG. 43 shows a stylized internal view of a mobile communication device in accordance with an exemplary embodiment of the present disclosure.

It should be understood that mobile communication device 750 can include a spool or reel such as that illustrated in FIG. 43 that contains a retractable and extendable cable configured for connection to antenna 772. The retractable wire enables antenna 772 to be positioned a spaced distance away from the user's head. It should also be understood that device 750 can include the elements shown in FIG. 2, such as speaker 16 and microphone 18, positioned at any suitable or available position such as the positions shown in FIG. 1, or any position located along longitudinal centerline 28, as well as in any position in any face of device 750 as described in any embodiment of the present disclosure.

Figure 32:
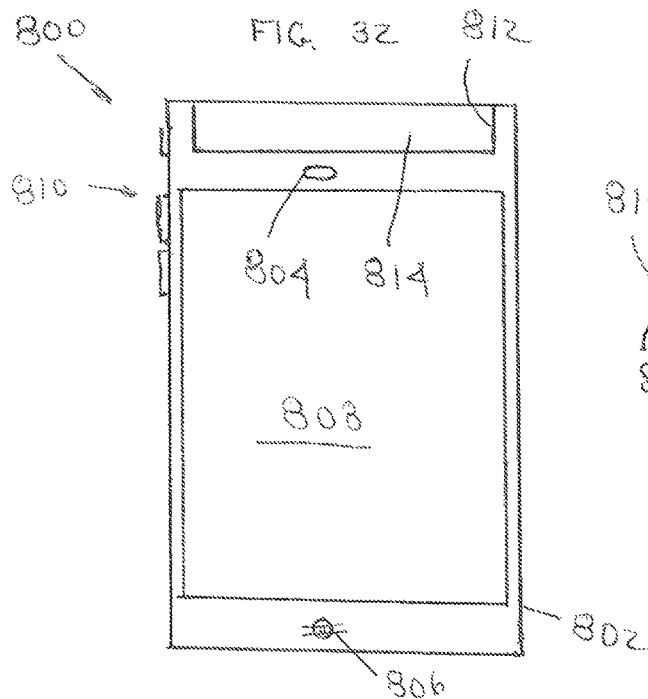
FIG. 32 shows a view of a mobile communication device in accordance with an exemplary embodiment of the present disclosure.
Figure 33:
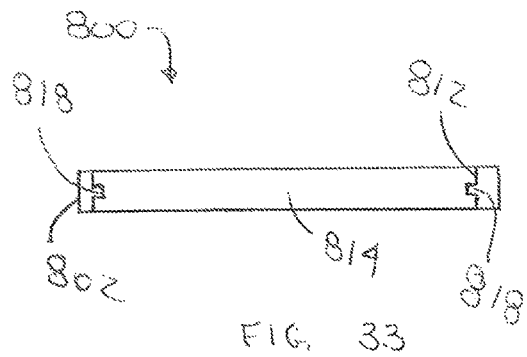
FIG. 33 shows a view of the mobile communication device of FIG. 32 showing an antenna of the mobile communication device.
Figure 34:
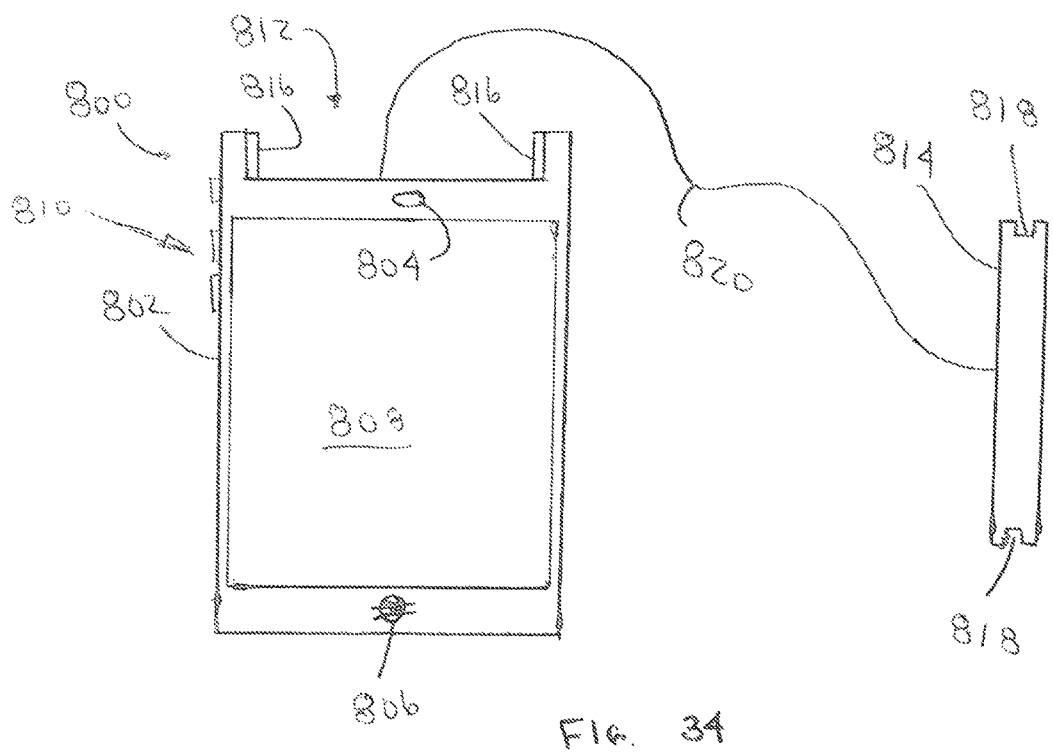
FIG. 34 shows a view of the mobile communication device of FIG. 32 with the antenna positioned a spaced distance from the mobile communication device.

FIGS. 32-34 show views of a mobile communication device, indicated generally at 800, in accordance with an exemplary embodiment of the present disclosure. Mobile communication device 800 includes a housing or casing 802 on or in which are positioned a speaker 804, a microphone 806, a display 808, and one or more controls 810 that can control, for example, power and volume. Housing 802 further includes a cavity or recess 812 that is configured to support a separable antenna 814. Housing 802 may include interface slides or rails 816 that extend along sides of cavity or recess 812. Separable antenna 814 can include a plurality of grooves or slots 818 that are configured to mate with slides or rails 816. Mobile communication device 800 further includes a wire or cable 820 that electrically connects separable antenna 814 to housing or casing 802. Wire or cable 820 can be retractably positioned in housing or casing 802 or in separable antenna 814.

When the user of mobile communication device 800 receives or makes a telephone call using mobile communication device 800, the user can slide separable antenna 814 from cavity or recess 812, simultaneously extending wire or cable 820. Separable antenna 814 can then be positioned a spaced distance from the user's head and brain to reduce the amount of RF radiation emitted from antenna 814 that enters the user's head and brain. Separable antenna 814 can be positioned on any suitable body part away from the brain or sensitive organs, or on any suitable surface away from the user, such as a table top, a desk top, a shelf, a bench, etc. Once the call is completed, the user can actuate a retraction mechanism to return wire or cable 820 to the interior of separable antenna 814 or housing or casing 802. It should be understood that device 800 can include the elements shown in FIG. 2, such as speaker 16 and microphone 18, positioned at any suitable or available position such as the positions shown in FIG. 1, or any position located along longitudinal centerline 28, as well as in any position in any face of device 800 as described in any embodiment of the present disclosure.

Figure 35:
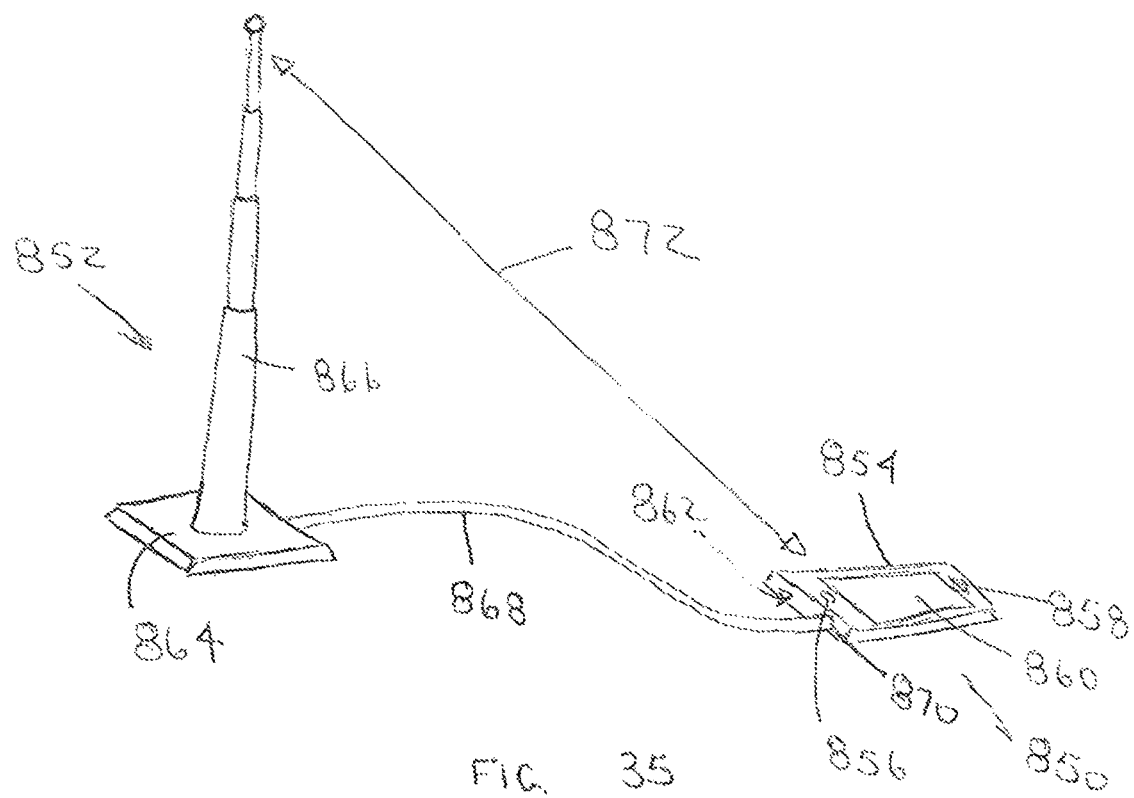
FIG. 35 shows a view of a mobile communication device and a separate antenna in accordance with another exemplary embodiment of the present disclosure.
Figure 36:
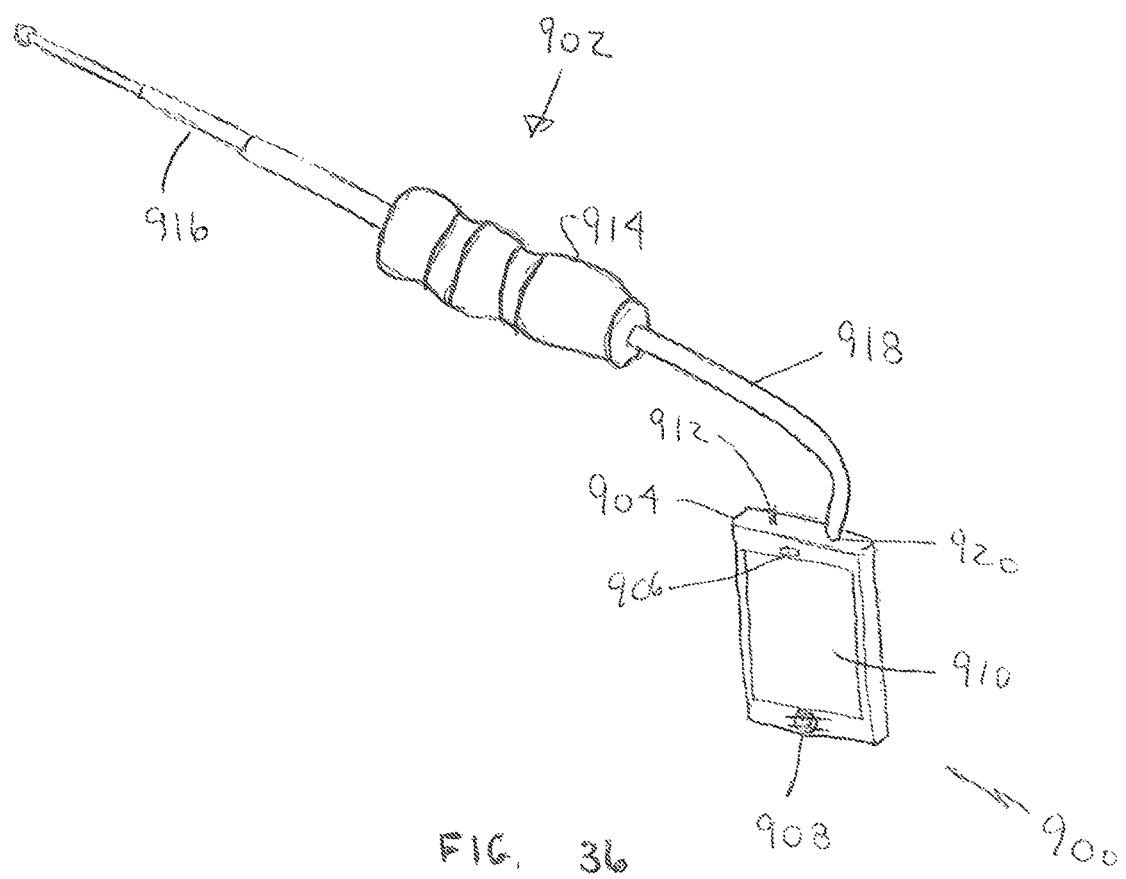
FIG. 36 shows a view of a mobile communication device and a separate antenna in accordance with yet another exemplary embodiment of the present disclosure.
Figure 37:
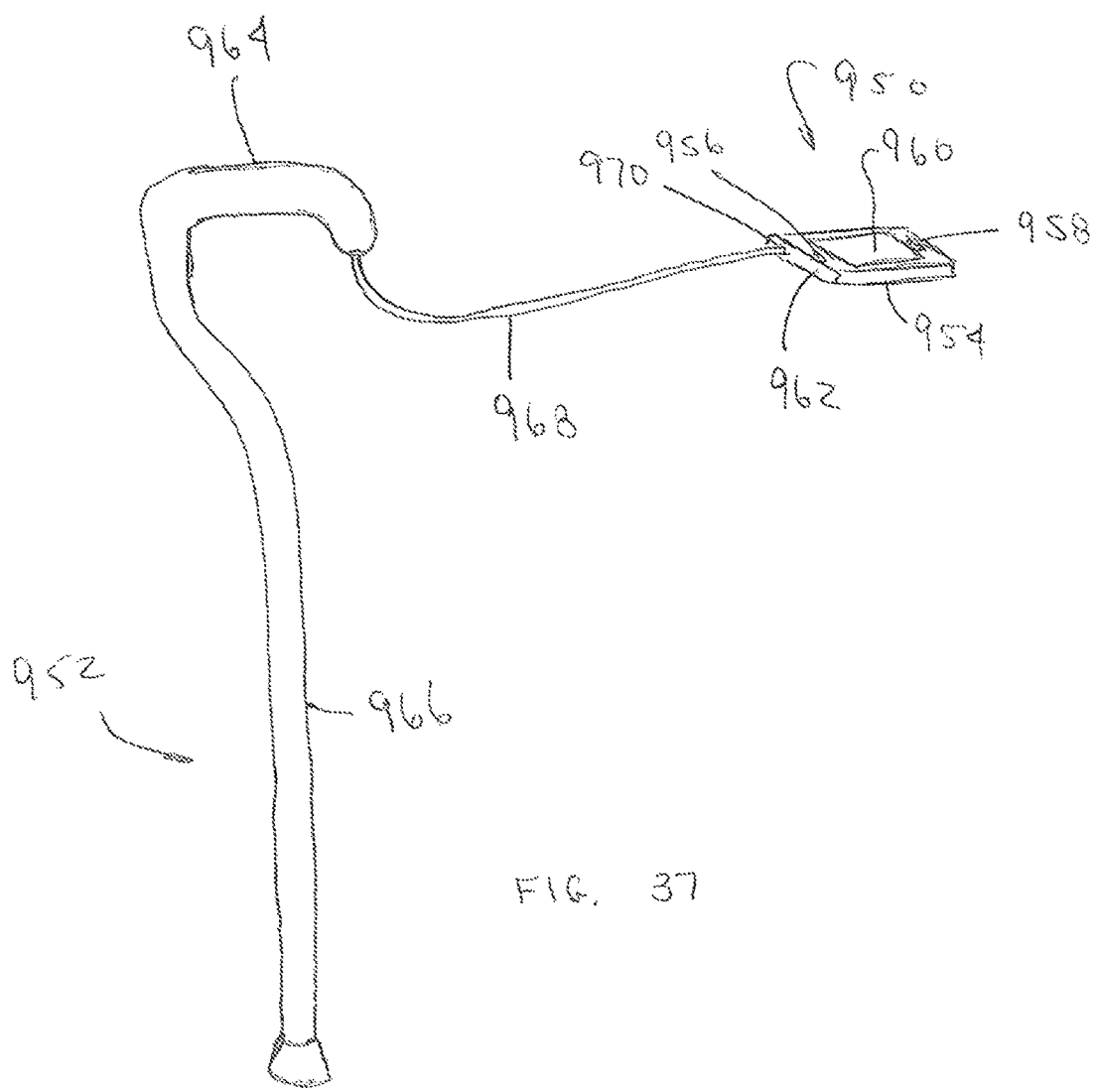
FIG. 37 shows a view of a mobile communication device and a separate antenna in accordance with a further exemplary embodiment of the present disclosure.

To decrease exposure to RF radiation, antennas can be configured as devices that are only temporarily connected to a mobile communication device, such as are shown in FIGS. 35-37.

FIG. 35 shows a view of a mobile communication device, indicated generally at 850, and a separate antenna, indicated generally at 852, in accordance with another exemplary embodiment of the present disclosure. Mobile communication device 850 includes a housing or casing 854, a speaker 856, a microphone 858, a display 860, and an internal antenna 862. Separate antenna 852 includes a base 864 and an extendable rod 866. Antenna 852 is connected to mobile communication device 850 by a wire or cable 868 by way of a connector 870 positioned in housing or casing 854. When separate antenna 852 is connected to mobile communication device 850, the connection causes a switch to disconnect internal antenna 862 from an internal transceiver while connecting separate antenna 852 to the internal transceiver. When the user wishes to make or receive a call, wire 868 is connected to mobile communication device 850, which disconnects internal antenna 862 electrically and electrically connects separate antenna 852, and rod 866 of antenna 852 is extended. Antenna 852 is positioned a spaced distance 872 from mobile communication device 850. For example, spaced distance 872 can be at least 45 centimeters. In another example, spaced distance 872 can be at least 50 centimeters. In another example, spaced distance 872 can be a range including a distance equal to or more than 10 centimeters up to a distance equal to or less than 100 centimeters. However, it should be understood that any spaced distance 872 can be used in the present disclosure. Spaced distance 872 reduces the impingement of RF radiation emitted by mobile communication device 850 on the head and brain of the user. It should be understood that device 850 can include the elements shown in FIG. 2, such as speaker 16 and microphone 18, positioned at any suitable or available position such as the positions shown in FIG. 1, or any position located along longitudinal centerline 28, as well as in any position in any face of device 850 as described in any embodiment of the present disclosure.

FIG. 36 shows a view of a mobile communication device, indicated generally at 900, and a separate antenna, indicated generally at 902, in accordance with yet another exemplary embodiment of the present disclosure. Mobile communication device 900 includes a housing or casing 904, a speaker 906, a microphone 908, a display 910, and an internal antenna 912. Separate antenna 902 includes a handle 914 and an extendable rod 916. Antenna 902 is connected to mobile communication device 900 by a wire or cable 918 by way of a connector 920 positioned in housing or casing 904. When separate antenna 902 is connected to mobile communication device 900, the connection causes a switch to disconnect internal antenna 912 from an internal transceiver while connecting separate antenna 902 to the internal transceiver. When the user wishes to make or receive a call, wire 918 is connected to mobile communication device 900, which disconnects internal antenna 912 electrically and electrically connects separate antenna 902, and rod 916 of antenna 902 is extended. When the user holds antenna 902 such that extendable rod 916 is aimed away from the user, extendable rod 916 is positioned a spaced distance from mobile communication device 900. The spaced distance reduces the impingement of RF radiation emitted by mobile communication device 900 on the head and brain of the user. It should be understood that device 900 can include the elements shown in FIG. 2, such as speaker 16 and microphone 18, positioned at any suitable or available position such as the positions shown in FIG. 1, or any position located along longitudinal centerline 28, as well as in any position in any face of device 900 as described in any embodiment of the present disclosure.

FIG. 37 shows a view of a mobile communication device, indicated generally at 950, and a separate antenna, indicated generally at 952, in accordance with yet another exemplary embodiment of the present disclosure. Mobile communication device 950 includes a housing or casing 954, a speaker 956, a microphone 958, a display 960, and an internal antenna 962. Separate antenna 952 includes a handle 964 and a body 966 configured as a cane. Antenna 952 is connected to mobile communication device 950 by a wire or cable 968 by way of a connector 970 positioned in housing or casing 954. When separate antenna 952 is connected to mobile communication device 950, the connection causes a switch to disconnect internal antenna 962 from an internal transceiver while connecting separate antenna 952 to the internal transceiver. When the user wishes to make or receive a call, wire 968 is connected to mobile communication device 950, which disconnects internal antenna 962 electrically and electrically connects separate antenna 952. Body or cane 966 can be positioned in a direction that is away from the user. When the user holds handle 964 and aims separate antenna 952 away from the user, the location in body or cane 966 where radiating elements are located is positioned a spaced distance from mobile communication device 950. The spaced distance reduces the impingement of RF radiation emitted by mobile communication device 950 on the head and brain of the user. It should be understood that device 950 can include the elements shown in FIG. 2, such as speaker 16 and microphone 18, positioned at any suitable or available position such as the positions shown in FIG. 1, or any position located along longitudinal centerline 28, as well as in any position in any face of device 950 as described in any embodiment of the present disclosure.

Figure 38:
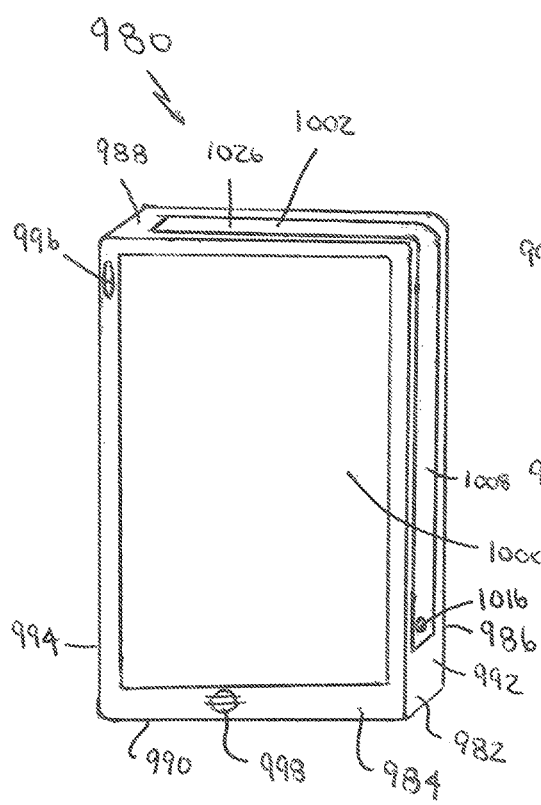
FIG. 38 shows a perspective view of a mobile communication device in accordance with a still further exemplary embodiment of the present disclosure.
Figure 39:
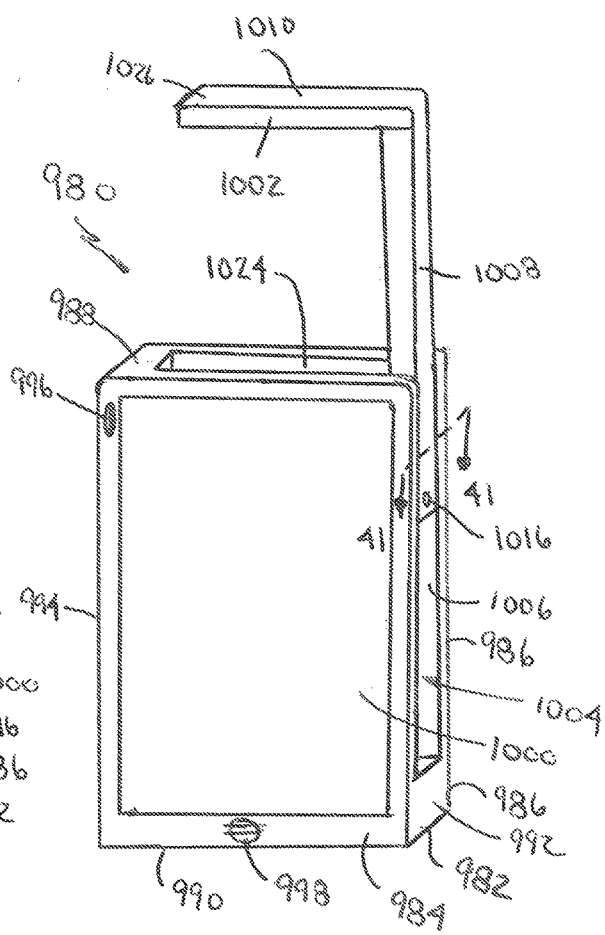
FIG. 39 shows another view of the mobile communication device of FIG. 38.

FIGS. 38 and 39 show views of a mobile communication device, indicated generally at 980, in accordance with a still further exemplary embodiment of the present disclosure. Mobile communication device 980 includes a housing 982. Housing 982 includes a plurality of faces, surfaces, or sides, including a front face, side, or surface 984 and a back face, side, or surface 986. In an exemplary embodiment, front face 984 is parallel to back face 986. A plurality of sides extend between front face 984 and back face 986 to connect front face 984 to back face 986, including a top or upper side 988, a bottom or lower side 990, a right side 992, and a left side 994. It should be understood that the terms front, back, top, bottom, left and right are entirely arbitrary and are used for convenience and consistency in explanation. It should be further understood that each of the sides could be described as a first side, second side, etc. Though the terms describing the sides are arbitrary, top side 988, bottom side 990, right side 992, and left side 994 are relatively short as compared to the dimensions of the front and back face. It should also be understood that joints between the various faces, sides, or surfaces can be configured as curvilinear surfaces, including a radius or a plurality of radii. For convenience, such joints are considered to be part of the respective side viewed in an elevation or plan view.

Mobile communication device 980 also includes a speaker 996, a microphone 998, a display 1000, and an antenna 1002.

In an exemplary embodiment, speaker 996 can be positioned on or in front face 984. Such position can include a location near to, or adjacent, an intersection between front face 984 and a side surface connecting front face 984 to back face 986, such as top side 988 or left side 994. In an exemplary embodiment, such intersection can be between, for example, front face 984, top side 988, and left side 994.

In an exemplary embodiment, microphone 998 can be positioned on or in front face 984. Such position can include a location near to, or adjacent, an intersection between front face 984 and a side surface connecting front face 984 to back face 986, such as bottom side or surface 990.

In an exemplary embodiment, display 1000 can be positioned on or in front face 984. Display 1000 can be used by an operator or user to input instructions into mobile communication device 980 and to display or present information regarding mobile communication device 980, such as status of mobile communication device 980. Display 1000 can also operate or function as a communication input and output, presenting information received by mobile communication device 980, which can be received wirelessly or via a wire connection, and receiving inputs from an operator or user requesting information from sources outside mobile communication device 980. It should be understood that device 980 can include the elements shown in FIG. 2, such as speaker 16 and microphone 18, positioned at any suitable or available position such as the positions shown in FIG. 1, or any position located along longitudinal centerline 28, as well as in any position in any face of device 980 as described in any embodiment of the present disclosure.

Antenna 1002 is attached to and is movable with respect to housing 982. In the exemplary embodiment of FIGS. 38-41, antenna 1002 is attached to a right side of housing 982 in a groove 1004. Groove 1004 can include angled sides 1006 that angle toward each other as the sides extend into an interior of housing 982 such that a width of a gap between angled sides 1006 decreases with depth into housing 982.

Antenna 1002 includes a base or support 1008, and an extension 1010. Base or support 1008 includes an exterior side or surface 1012 that is approximately coplanar with, for example, one of right side 992, left side 994, and back face 986. In the embodiment of FIGS. 38-42, exterior side or surface 1012 is approximately coplanar with right side, face, or surface 992 of housing 982. Base 1008 further includes at least two angled surfaces 1014 that extend from exterior side or surface 101. Angled surfaces 1014 are sized and dimensioned to interface with angled sides 1006 of housing 982 with a sufficient gap between angled sides 1006 and angled surfaces 1014 to permit base or support 1008 to slide with respect to housing 982. In addition, the material and coefficient of friction of the material of base or support 1008 and housing 982 is such that while the coefficient of friction permits sliding of base or support 1008 with respect to housing 982 under a force of movement by a user or operator, when such force is removed or stopped, the coefficient of friction maintains the position of base or support 1008 with respect to housing 982.

Housing 982 includes a slot, channel, groove, or receiving feature 1024 that is sized and dimensioned to provide a storage location for antenna 1002 when antenna 1002 is moved toward housing 982 to be at the closest position to housing 982 as possible. When antenna 1002 is fully retracted toward and into housing 982, a top surface 1026 of extension 1010 is approximately coplanar or flush with top side or surface 988 of housing 982.

A stop 1016 can be inserted into and through base or support 1008 to extend past a side or surface 1018 of base or support 1008 to engage with an internal stop formed within housing 982 (not shown). Side or surface 1018 is approximately parallel to exterior side 1012, and side or surface 1018 is connected to and extends from one angled side or surface 1014 to the other angled side or surface 1014. Stop 1016 engages an internal feature of housing 982 that form the internal stop to prevent antenna 1002 from disengaging from mobile communication device 980.

As best shown in FIGS. 41 and 42, captured within antenna 1002 is an electrical wire or conduit 1020 and a radio frequency (RF) emission/reception device 1022. Electrical wire or conduit 1020 connects an internal transceiver (not shown) of mobile communication device 980 with emission/reception device 1022. It should be understood that the term "antenna" is used in this embodiment to describe the device that includes emission/reception device 1022, which would typically be described as an antenna. Accordingly, emission/reception device 1022, which is configured to transmit and to receive radio frequency energy, can also be described as an antenna.

In operation, the internal transceiver (not shown) of mobile communication device 980 functions to transmit RF energy via electrical wire or conduit 1020 to RF emission/reception device 1022, which transmits RF energy wirelessly to be available for reception at a separate electronic device (not shown). Similarly, such separate electronic device is configured to transmit RF energy, which is received by RF emission/reception device 1022 and sent as electrical signals to the internal transceiver or mobile communication device 980.

As discussed hereinabove, the RF energy transmitted by RF emission/reception device 1022 may be harmful to certain tissues of the human body, such as the brain. Accordingly, antenna 1002 is configured to be slidingly movable with respect to housing 982 to move antenna 1002 away from housing 982 to position RF energy emitted from antenna 1002 to be positioned to be at least a small spaced distance from sensitive eye and brain tissues of the user or operator. Such spaced distance can be important because emitted RF energy is proportional to the cube of the distance from RF emission/reception device 1022. Thus, antenna 1002 includes a first, stored, or retracted position shown in FIG. 38, and a second, extended position shown in FIG. 39.

Some disclosed embodiments of the present disclosure include retraction mechanisms to retract wires and/or cables. FIG. 43 shows a stylized internal view of a mobile communication device 1030 in accordance with an exemplary embodiment of the present disclosure that includes, among other things, an internal retraction mechanism 1032. There are many internal configurations of mobile communications devices, accordingly, the configuration disclosed in FIG. 43 is meant to be illustrative rather than comprehensive.

Mobile communication device 1030 can include a housing 1034. Housing 1034 can include an internal cavity or compartment 1036 and a recess 1038 that can be at least partially positioned external to internal cavity or compartment 1036 on an opposite side of a wall 1040 that is part of housing 1034. Also included as part of mobile communication device 1030 and located within internal cavity or compartment 1036 are, for example, electronic components 1042, at least a portion of which can be positioned on a circuit board. Electronic components 1042 can include a processor, power conditioning circuits, a display driver, which can also be part of the processor, a non-transitory memory, audio circuitry, a transceiver, and other circuitry needed to provide the functional features of mobile communication device 1030. Other components that can be positioned within internal cavity or compartment 1036 are speaker 996, microphone 998, a battery or power source 1044, and retraction mechanism 1032.

Retraction mechanism 1032 includes a spring mechanism (not shown) and a spool (not shown) on which is wound a wire 1046. Wire 1046 extends from extraction mechanism 1032 to a connector 1048. Though not shown, wire 1046 is electrically connected to the transceiver positioned in internal cavity or compartment 1036. Connector 1048 is positioned in recess 1038 for storage. When a user or operator of mobile communication device wants to connect mobile communication device 1030 to an external antenna that is separate from mobile communication device 1030, the user can tip an end of connector 1048 and then grasp an exposed portion of connector 1048 to then be able to pull connector 1048 from recess 1038. Pulling on recess 1038 will then pull wire 1046 from retraction mechanism 1032. The retracted connector 1048 can then be connected to a separate antenna, such as those shown in FIGS. 35-37 and 44.

It should be understood that retraction mechanism 1032 can be operated to pull wire 1046 back into retraction mechanism 1032, simultaneously winding wire 1046 back onto an internal spool of retraction mechanism 1032. It should also be understood that mobile communication device 1030 can include a switch to disconnect an internal antenna, if mobile communication device 1030 includes such, when an external antenna is connected by way of connector 1048 to an external antenna. It should be understood that device 1030 can include the elements shown in FIG. 2, such as speaker 16 and microphone 18, positioned at any suitable or available position such as the positions shown in FIG. 1, or any position located along longitudinal centerline 28, as well as in any position in any face of device 1030 as described in any embodiment of the present disclosure.

Figure 44:
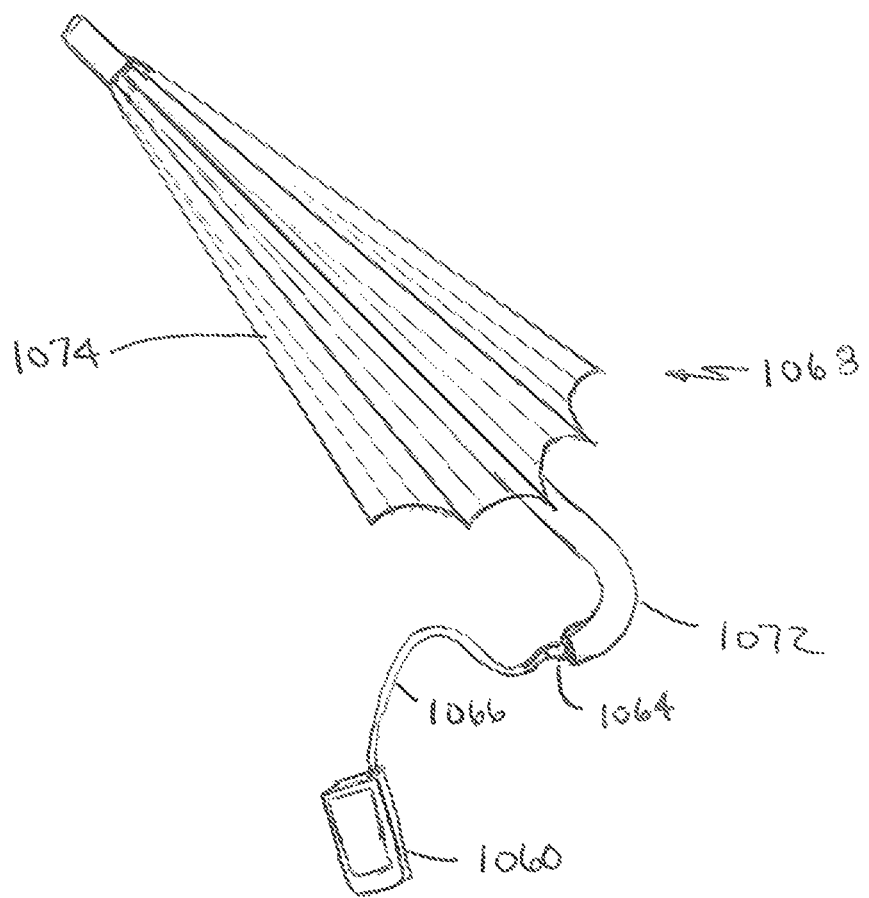
FIG. 44 shows a view of a mobile communication device and a separate antenna in accordance with another exemplary embodiment of the present disclosure.
Figure 45:
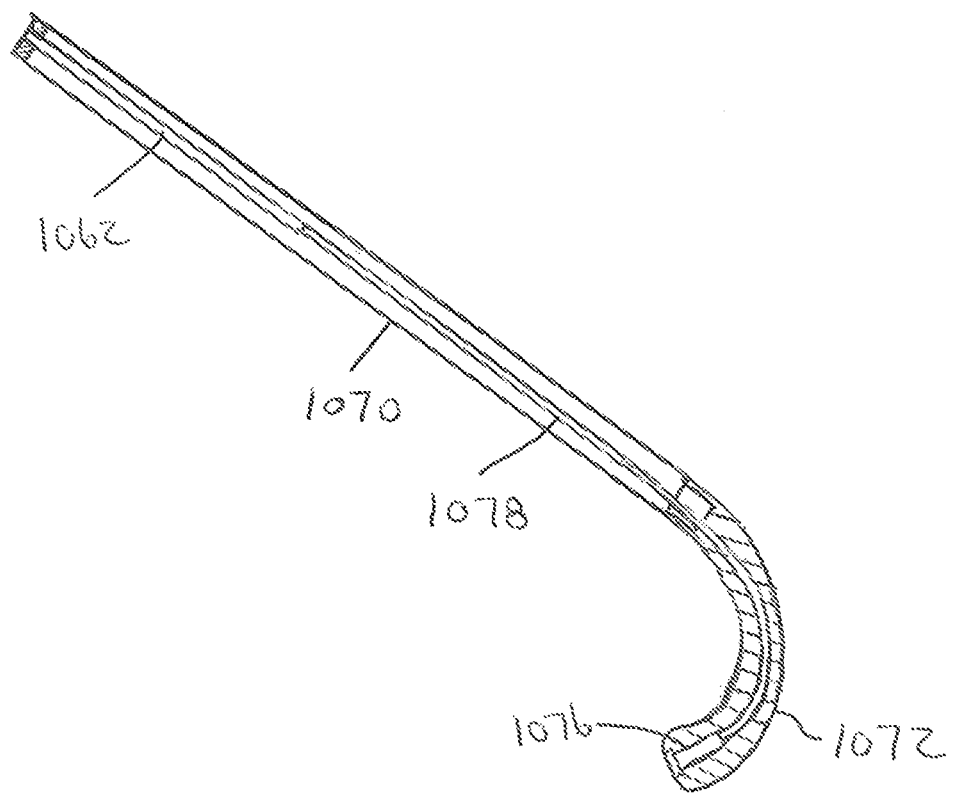
FIG. 45 shows a sectional view of a portion of the separate antenna of FIG. 44.

FIGS. 44 and 45 show views of a mobile communication device, indicated generally at 1060, and a separate antenna, indicated generally at 1062 in FIG. 45, in accordance with another exemplary embodiment of the present disclosure. Mobile communication device 1060 can be similar to mobile communication device 1030 shown in FIG. 43 and can thus include a retractable connector 1064 attached or secured to mobile communication device 1030 by a wire 1066. Separate antenna 1062 is positioned within an umbrella 1068. Umbrella 1068 includes a central support or shaft 1070, a handle 1072, and a canopy 1074. Antenna 1062 can be positioned in shaft 1070 at, for example, a position that is nearer to a second end of shaft 1070 that is further from a first end of shaft 1070 that serves as an attachment location for handle 1072. Handle 1072 of umbrella 1068 further includes a connector 1076 that is sized and dimensioned to mate with connector 1064. Connector 1076 is electrically connected to antenna 1062 by a cable including conductive wires 1078. When a mobile communication device is connected to umbrella 1068, electrical signals can travel between the mobile communication device 1060 and antenna 1062 by way of wire 1066, connector 1064, and wires 1078. Thus, RF energy received by antenna 1062 is transmitted as electrical signals to mobile communication device 1060 and electrical signals sent to antenna 1062 by mobile communication device 1060 are emitted from antenna 1062 as RF energy.

Figure 46:
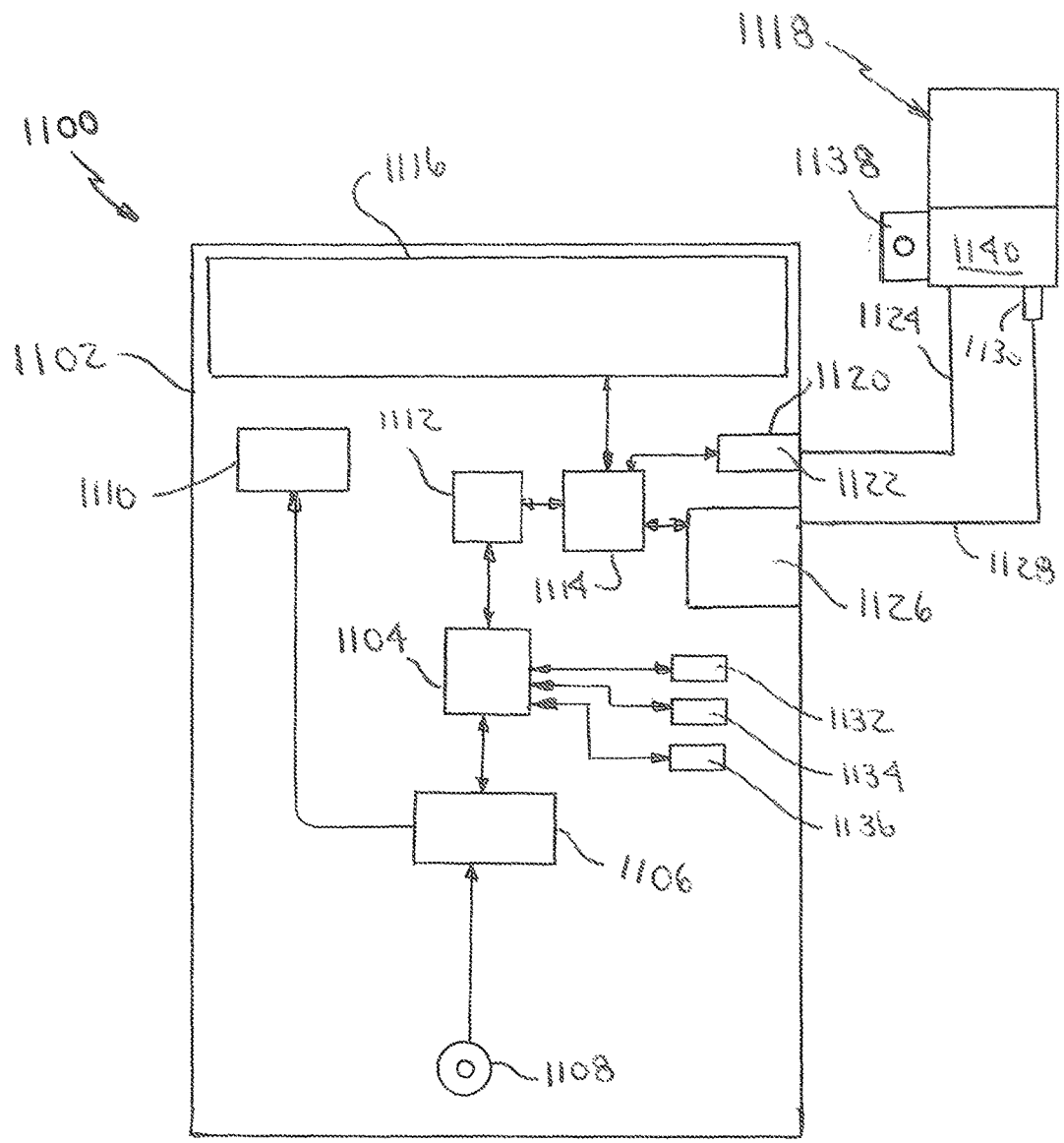
FIG. 46 shows a block diagram of a mobile communication device in accordance with an exemplary embodiment of the present disclosure.

FIG. 46 shows a block diagram of a mobile communication device, indicated generally at 1100, in accordance with an exemplary embodiment of the present disclosure. Device 1100 includes a casing or housing 1102 configured to contain and/or support various elements of mobile communication device 10. Positioned on or in housing 1102 is a processor 1104. Also positioned on or in housing 1102 and electrically connected to processor 1104 is an analog-to-digital (A/D) converter 1106, which is electrically connected to a microphone 1108 and a speaker 1110, both of which are also positioned on or in housing 1102. A/D converter 1106 receives signals from microphone 18 in analog form and converts those signals to digital signals for transmission to processor 1104. A/D converter 1106 also receives digital signals from processor 1104 representing audio signals that A/D converter 1106 converts to analog signals for transmission to speaker 1110.

Mobile communication device 1100 further includes a transceiver 1112, a transceiver switch 1114, and an antenna 1116. Transceiver 1112 and transceiver switch 1114 are positioned internal to housing 1002. Antenna 1116 can be positioned internal to housing 1002, external to and on housing 1002, or partially internal to and partially external to and on housing 1002. Processor 1104 transmits signals to transceiver 1112 for conversion from digital signals to electrical signals suitable for transmission by antenna 1116. Signals from transceiver 1112 are transmitted or provided to transceiver switch 1114, which determines which antenna should receive the signals provided by transceiver 1112, which is described in more detail hereinbelow. Signals from transceiver switch 1112 can be provided to mobile communication device antenna 1116 or to a separate, external antenna 1118.

To connect signals to external antenna 1118, in an exemplary embodiment mobile communication device 1100 can include a connector 1120 positioned on or in housing 1102. Connector 1120 is configured to receive an antenna connector 1122, and antenna connector 1122 is electrically connected to external antenna 1118 by a wire or cable 1124. It should be understood that antenna connector 1122 is removable or separable from device connector 1120.

In another exemplary embodiment, mobile communication device 1100 can connect to separable, external antenna 1118 by a retraction mechanism 1126. Retraction mechanism can include an internal spool or reel (not shown) configured to retractably store or locate a wire or cable 1128 that terminates with an antenna connector 1130. It should be understood that antenna connector 1130 is removably or separably attachable to antenna 1118. Thus, when retraction mechanism 1126 is operated wire or cable 1128 will retract into retraction mechanism 1126. Antenna connector 1130 can retract into a recess formed in housing 1002, such as recess 1038 shown in FIG. 43.

It should be understood that a mobile communication device can include only one of connector 1120 and retraction mechanism 1126. Furthermore, it is anticipated that only one of connector 1120 and retraction mechanism 1126 are likely to be positioned on or in housing 1002. However, both connector 1120 and retraction mechanism 1126 can be positioned on or in housing 1002, as will be described in more detail hereinbelow.

It should be understood that the description provided for FIG. 46 to this point has been for transmission of signals provided by processor 1104. Signals can also be received by mobile communication device 1100, in which case the flow of signals is opposite to that described hereinabove. For example, signals can be received by antenna 1116 and transmitted to transceiver switch 1114 and then to transceiver 1112. Transceiver 1112 converts the received signals to digital signals, which are then transmitted or provided to processor 1104. As another example, signals can be received from separate, external antenna 1118 and transmitted to transceiver switch 1114 and then to transceiver 1112, which operates as described previously herein.

Mobile communication device 1100 can include other features or elements positioned on or in housing 1002, such as a sim card 1132, a non-transient memory 1134, and a display 1136, each of which operates in a conventional manner.

In exemplary embodiments, external antenna 1118 can be an antenna only, or can include a base. Furthermore, in an exemplary embodiment external antenna 1118 can include a power source or supply 1138 and internal electronics 1140. In an exemplary embodiment, power source or supply 1138 can include, for example, an internal battery or other storage device. In another exemplary embodiment, power source or supply 1138 can include a plug and cable for connector to a conventional wall outlet.

Internal electronics 1140 can include an amplifier to amplify signals received by external antenna 1118. Such amplification may be useful in situations where wire or cable 1124 or 1128 is sufficiently long to reduce the signal from transceiver 1112 below a level sufficient for communication with, for example, a cell phone tower.

In another exemplary embodiment, external antenna 1118 can include a separate transceiver that can generate a radio frequency that is different from the radio frequency of transceiver 1112. Such different radio frequency can be generated continuously, or can be selected by a processor internal to external antenna 1118, such as a processor as disclosed in FIG. 54 hereinbelow. In yet another exemplary embodiment, transceiver 1112 can generate more than one frequency that can be selectable based on use of antenna 1116 or external antenna 1118. In yet another exemplary embodiment, transceiver 1112 can generate more than one frequency that can be selectable by processor 1104.

Figure 47:
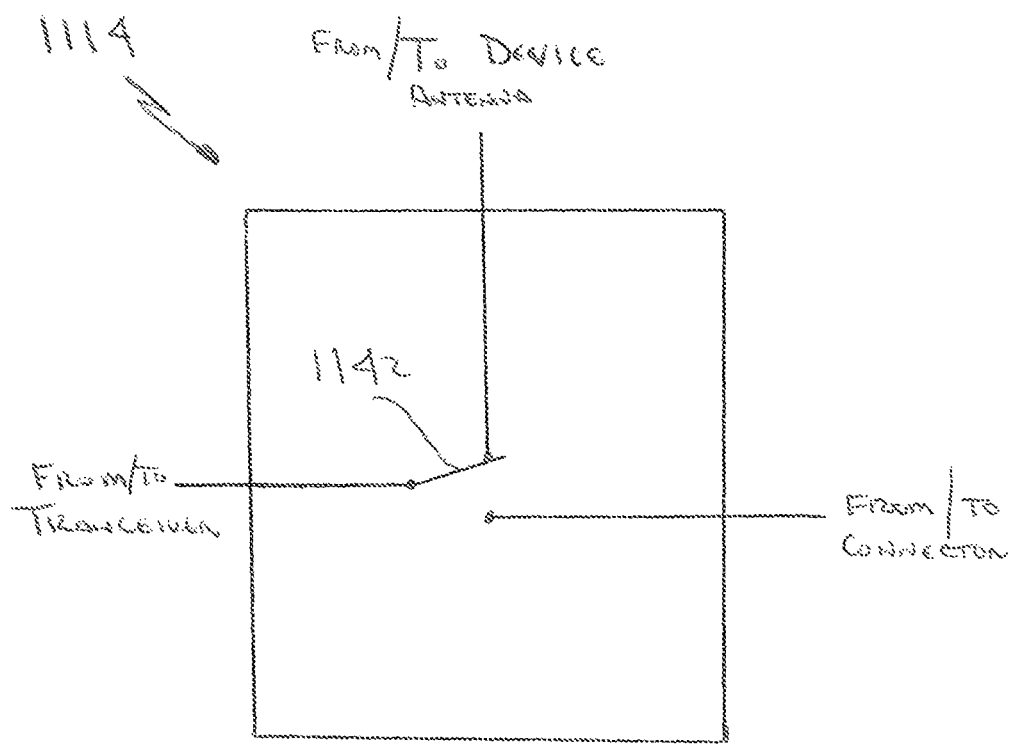
FIG. 47 shows a schematic of a transceiver switch of the block diagram of FIG. 46 in accordance with an exemplary embodiment of the present disclosure.

FIG. 47 shows a schematic of transceiver switch 1114 of the block diagram of FIG. 46 in accordance with an exemplary embodiment of the present disclosure. Transceiver switch 1114 includes a switch 1142. Switch 1142 can be a single pole, single throw switch that connects signals from transceiver 1112 to device antenna 1116 in a default or normal position. When an antenna connector 1122 is inserted into connector 1120, or when retraction mechanism 1126 is operated, switch 1142 is actuated, which can be mechanically by, for example, interaction of antenna connector 1122 with switch 1142 or by interaction of a portion of retraction mechanism 1126 with switch 1142, or electrically by, for example, actuation of a relay (not shown) by way of continuity through antenna connector 1122. Switch 1126 will then connect signals to and from transceiver 1112 from and to external antenna 1118.

Figure 48:
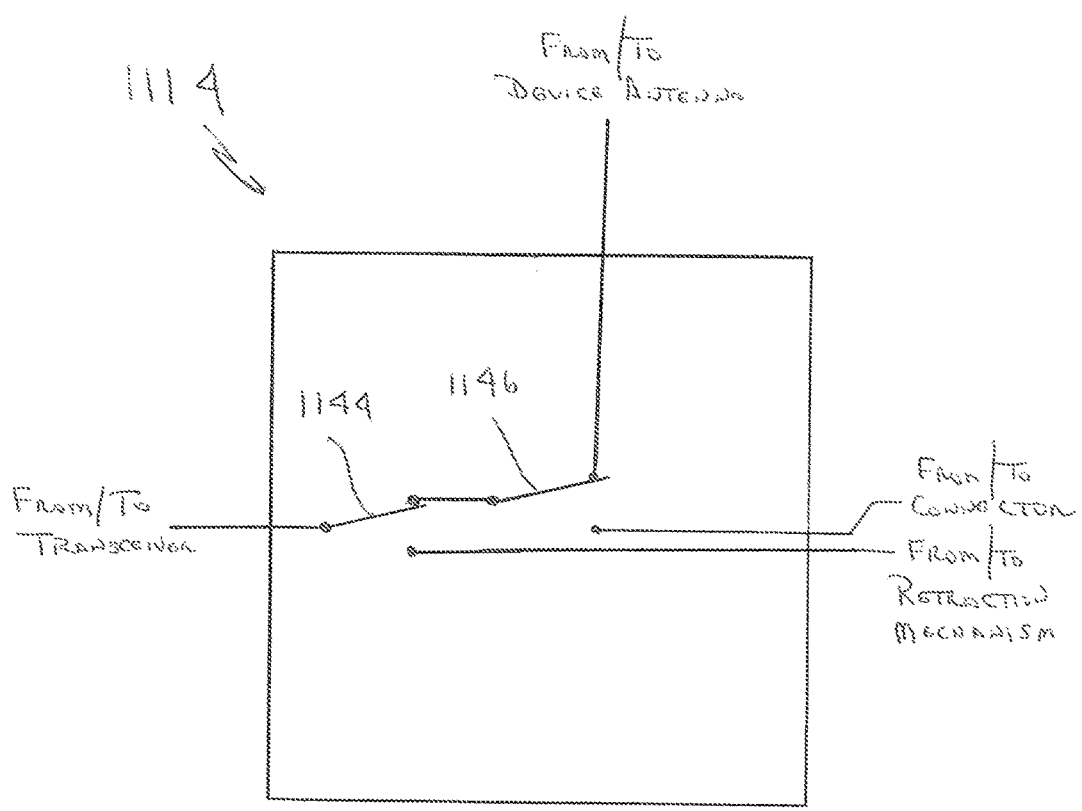
FIG. 48 shows another schematic of a transceiver switch of the block diagram of FIG. 46 in accordance with an exemplary embodiment of the present disclosure.

FIG. 48 shows another schematic of transceiver switch 1114 of the block diagram of FIG. 46 in accordance with an exemplary embodiment of the present disclosure. In this embodiment, transceiver switch 1114 includes a switch 1144 and a switch 1146. Each switch 1144 and 1146 can be a single pole, single throw switch that connects signals from transceiver 1112 to device antenna 1116 in a default or normal position.

When retraction mechanism 1126 is operated, switch 1144 is actuated, which can be mechanically by, for example, interaction of a portion of retraction mechanism 1126 with switch 1144, or electrically by, for example, actuation of a relay (not shown) by way of continuity through a portion of retraction mechanism 1126. Switch 1144 will then connect signals to and from transceiver 1112 from and to external antenna 1118.

When an antenna connector 1122 is inserted into connector 1120, switch 1144 is actuated, which can be mechanically by, for example, interaction of antenna connector 1122 with switch 1144 or electrically by, for example, actuation of a relay (not shown) by way of continuity through antenna connector 1122.

The configuration of transceiver switch 1114 is such that priority is given to retraction mechanism 1126. In other words, when retraction mechanism 1126 is used, it is not possible for signals to be transmitted to connector 1120. This priority is logical from the perspective that if both connector 1120 and retraction mechanism 1126 are provided in a same device, one input/output via connector 1120 and retraction mechanism 1126 needs to take priority to avoid degraded signals by connection to a plurality of signal paths.

Figure 49:
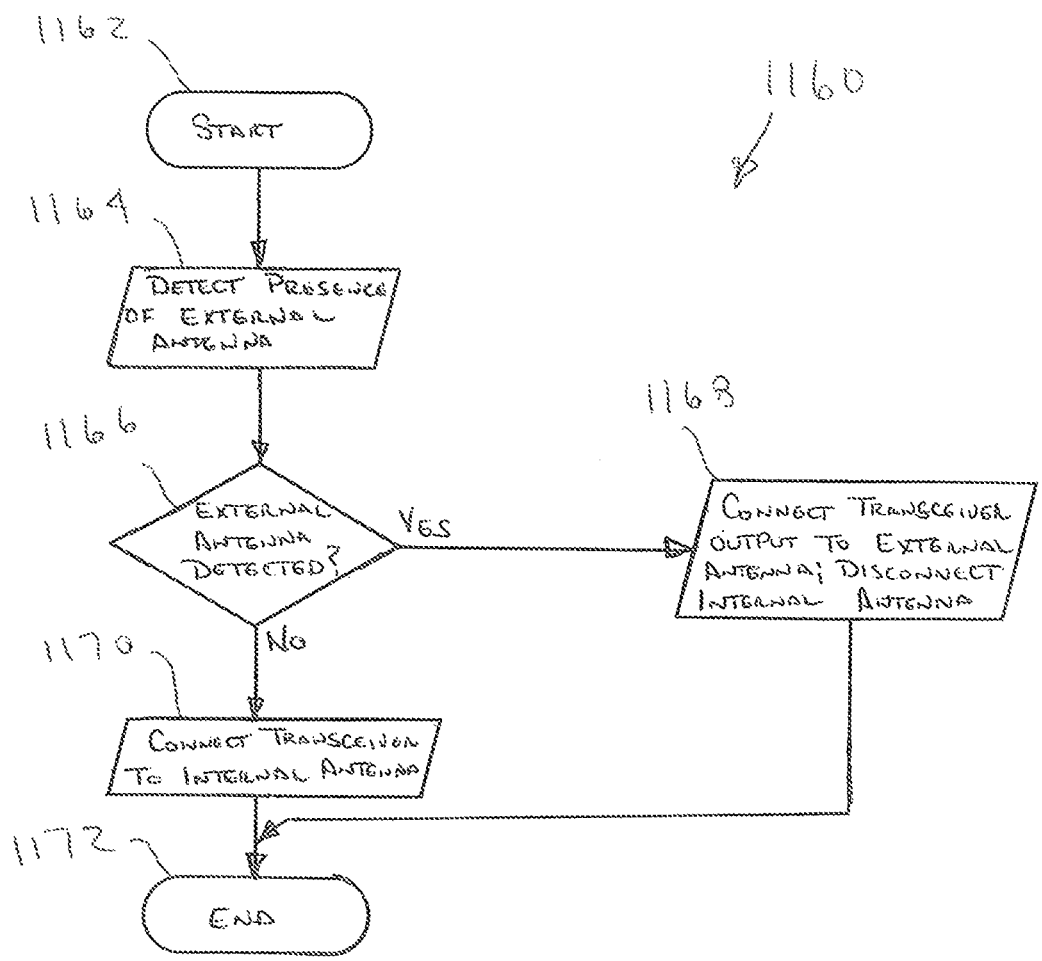
FIG. 49 shows a process flow in accordance with an exemplary embodiment of the present disclosure.

FIG. 49 shows an antenna connection/disconnection process flow, indicated generally at 1160, in accordance with an exemplary embodiment of the present disclosure. Process flow 1160 describes one operation of, for example, mobile communication device 1100.

Process flow 1160 begins with a start process 1162, which can be a handoff from a calling routine. Start process can clear registers, store preliminary values, etc., in preparation for implementing process flow 1160. Once start process 1162 is complete, control is passed from start process 1162 to a presence detection process 1164.

In presence detection process 1164, mobile communication device 1100 detects the presence of an external antenna. As described hereinabove, such detection can be by the actuation of transceiver switch 1114. Once detection, or lack of detection, of a separate external antenna is complete, control is passed from presence detection process 1164 to an external antenna detected decision process 1166.

In external antenna detected decision process 1166, a determination of whether an external antenna was detected is made. If an external antenna was detected, control passes from external antenna detected decision process 1166 to an external antenna connection process 1168.

In external antenna connection process 1168, connection of signals from, for example, transceiver 1112, to, for example, connector 1120 or retraction mechanism 1126 is made. At the same time connection to connector 1120 or retraction mechanism 1126 is made, signals from transceiver 1112 are disconnected from mobile communication device antenna 1116. Once transceiver output is connected to connector 1120 or retraction mechanism 1126, control passes from external antenna connection process 1168 to an end process 1172, which terminates an antenna connection/disconnection process flow 1160.

Returning to external antenna detected decision process 1166, if no external antenna is detected, control passes from external antenna detected decision process 1166 to an internal antenna connection process 1170. It should be understood that antenna connection/disconnection process flow 1160 operates repeatedly during the operation of mobile communication device 1100. Thus, if an external antenna, such as separate, external antenna 1118, is connected to mobile communication device 1100, and later disconnected from mobile communication device 1100, then signals from transceiver 1112 will be reconnected to antenna 1116 of mobile communication device 1100 by, for example, movement of switch 1142 from an actuated position to an unactuated position. It should also be understood that if no external antenna is detected and switch 1142 is already in an unactuated position, then internal antenna connection process 1170 maintains the existing connection between transceiver 1112 and antenna 1116. Once internal antenna connection process 1170 is complete, control passes from internal antenna connection process 1170 to end process 1172, which functions as described hereinabove.

It should be understood that an external antenna, such as external antenna 1118, can be included as part of another device, which can be described as an article, as described herein, including being housed or positioned on or in devices or articles including, but not limited to: (i) wearable articles: clothing (such as shirt, jacket, coat, scarf, hat, and the like), wristband, arm band, bracelet, necklace, belt buckle, belt, knee cap, specialized ring, watch, and the like; (ii) personal articles: wallet, credit card, pen, bottle, cup, sleeping bag, blanket, mattress, and the like; (iii) table top articles: clock, picture frame, and the like; (iv) computer, camera, and the like; (v) transportation: bike, motorcycle, car, trucks, boat, train, plane and the like; (vi) furniture: table, chair, desk, bed, couch, and the like; and (vii) article of manufacturing.

It should be understood that any of the articles or devices described herein above can integrate the antenna of the present invention as integral part of the article or device. It should also be understood that the antenna of the present disclosure can be removably attached to any of the articles or devices described herein. The articles described herein can then be manufactured with an antenna built in the article. The antenna in the article can include a connector for a wire, the wire having a second connector to connect with the mobile communication device.

An exemplary embodiment of the present disclosure in operation can include a picture frame housing an antenna of the present invention. The picture frame can preferably include a picture frame having a support structure configured to position the picture frame on a flat surface such as the flat surface of a desk, with the picture frame easily reachable by a user sitting on the desk, but the picture frame being located away from the user's head and body. At the time the user makes a phone call, the user connects the cable of the antenna housed in the picture frame to the mobile communication device. Hence, at least two advantages of the present invention are achieved: (i) by having the antenna away from the user's head the present invention removes radiation from reaching the user's head, and (ii) by having the antenna housed in a separate article, allows better reception and less interference with other internal components and elements of the mobile communication device, and by having a larger antenna, which is enabled by the picture frame (that is larger than mobile communication device), allows an even better communication with a cellular phone tower or a remote device.

In FIGS. 50-60, similar elements are provided with the same item number for the sake of brevity.

Figure 50:
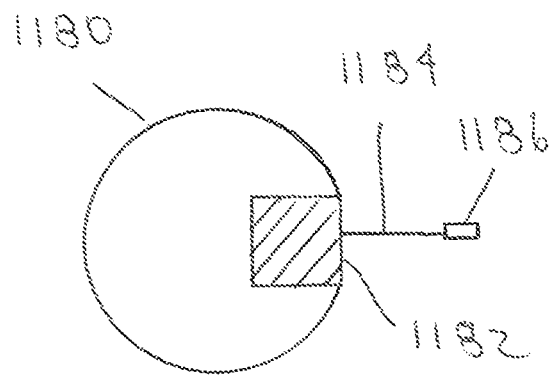
FIG. 50 shows a view of an article including an integral antenna in accordance with an exemplary embodiment of the present disclosure.

FIG. 50 shows a view of an article, indicated at 1180, including an integral antenna, indicated at 1182, in accordance with an exemplary embodiment of the present disclosure. Article 1180 can be any of the devices or articles disclosed hereinabove, such as wearable articles, personal articles, table top articles, electronic articles, transportation articles, furniture articles, and other articles of manufacture. A connector 1186 configured for connection to a mobile communication device is attached or connected to antenna 1182. In the embodiment of FIG. 50, antenna 1182 is integrally formed as part of article 1180, and thus is not separable from article 1180.

Figure 51:
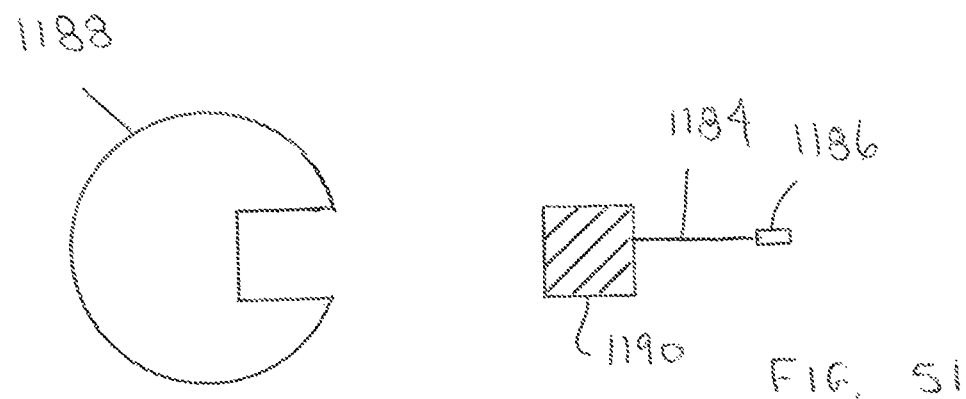
FIG. 51 shows a view of an article including a removable antenna in accordance with an exemplary embodiment of the present disclosure.

FIG. 51 shows a view of an article, indicated at 1188, including an antenna, indicated at 1190, which is removable or separable from article 1188, accordance with an exemplary embodiment of the present disclosure. As with FIG. 51, connector 1186 is connected to antenna 1190 by wire or cable 1184.

Figure 52:
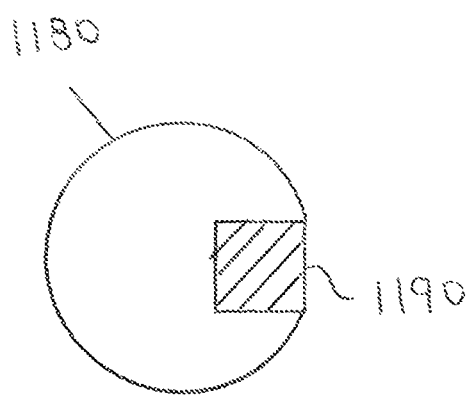
FIG. 52 shows the article of FIG. 50 with a cable and connector in a stored or stowed position.

FIG. 52 shows article 1180 and antenna 1182 of FIG. 50 with cable or wire 1184 and connector 1186 in a stored or stowed position. Such stowed or stored position can include a compartment or attachment location (not shown) on article 1180.

Figure 53:
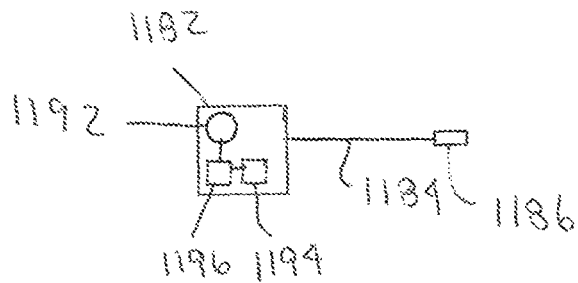
FIG. 53 shows a block diagram of a separable antenna in accordance with an exemplary embodiment of the present disclosure.

FIG. 53 shows a block diagram of a separable antenna 1182 in accordance with an exemplary embodiment of the present disclosure. Antenna 1182 can include a power supply or source 1192, which can be a battery or other storage device, or a separate source of electrical power, signal conditioning circuitry 1194, and an amplifier 1196. Signal conditioning circuitry 1194 is optional and can be configured to address any noise or errors caused by transmission of signals from the mobile communication device. Amplifier 1196 is configured to increase the strength of the signal transmitted from the mobile communication device prior to transmission from antenna electrodes. Amplifier 1196 can also amplify received signals, and signal conditioning circuitry 1194 can also improve signal quality prior to transmission to the mobile communication device.

Figure 54:
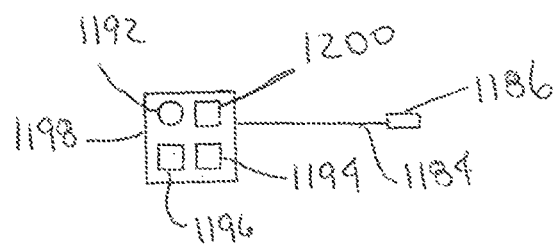
FIG. 54 shows a block diagram of a separable antenna in accordance with another exemplary embodiment of the present disclosure.

FIG. 54 shows a block diagram of a separable antenna, indicated at 1198, in accordance with another exemplary embodiment of the present disclosure. Antenna 1198 is similar to antenna 1192. However, antenna 1198 also includes a processor 1198. Processor 1198 can be used to, for example, adapt signal conditioning and amplification based on variable signal strength and noise.

Figure 55:
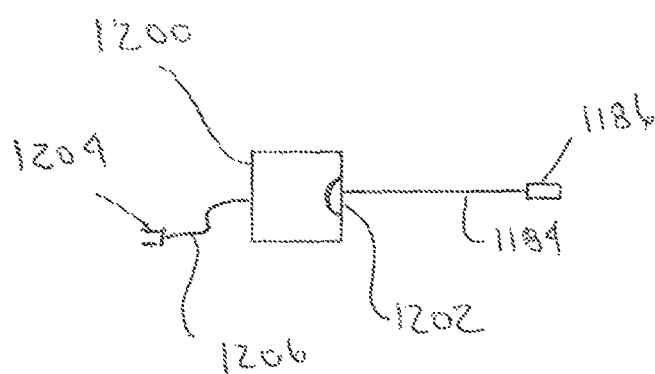
FIG. 55 shows a block diagram of a separable antenna in accordance with a further exemplary embodiment of the present disclosure.

FIG. 55 shows a block diagram of a separable antenna, indicated at 1200, in accordance with a further exemplary embodiment of the present disclosure. Antenna 1200 includes a retraction mechanism 1202 that includes a spool or reel (not shown) to "take up" or store wire or cable 1184 on actuation. Antenna 1200 further includes a power connector 1204, which can be, for example, a connector for an electrical outlet, connected to antenna 1200 by a power cable 1206. External power provided by way of power connector 1204 and power cable 1206 can power amplifier 1194, power conditioning circuitry 1196, and processor 1198.

Figure 56:
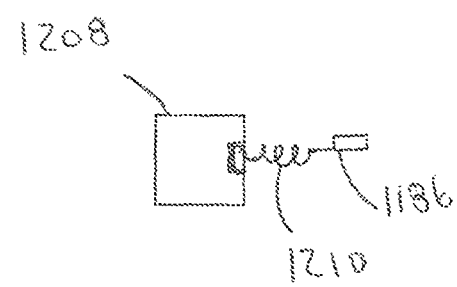
FIG. 56 shows a block diagram of a separable antenna in accordance with a further yet exemplary embodiment of the present disclosure.

FIG. 56 shows a block diagram of a separable antenna, indicated at 1208, in accordance with a further yet exemplary embodiment of the present disclosure. Separable antenna 1208 includes a coiled wire or cable 1210 that provides limited retraction of wire or cable 1210.

Figure 57:
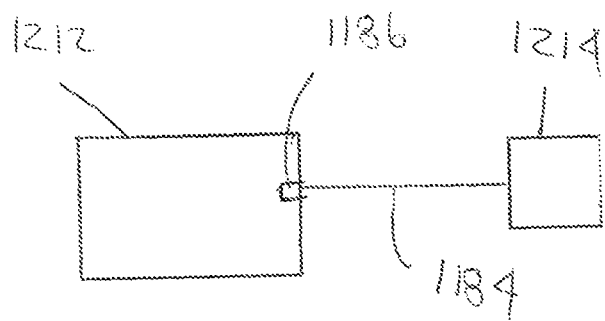
FIG. 57 shows a block diagram of a mobile communication device and a separable antenna in accordance with a still further exemplary embodiment of the present disclosure.
Figure 58:
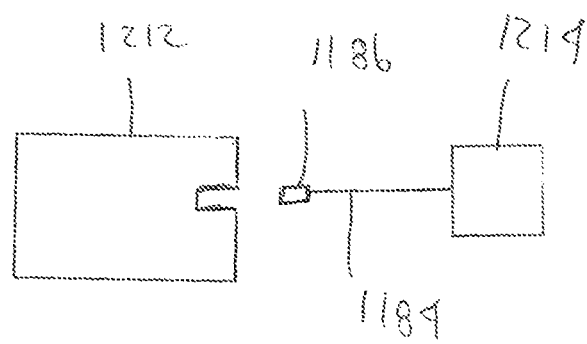
FIG. 58 shows the mobile communication device and separable antenna of FIG. 57 with the separable antenna disconnected from the mobile communication device.
Figure 59:
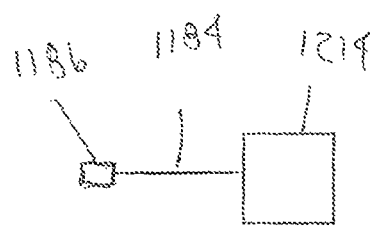
FIG. 59 shows a view of the separable antenna of FIGS. 57 and 58.

FIGS. 57-59 shows a block diagram of a mobile communication device, indicated at 1212, and a separable antenna, indicated at 1214 in accordance with a still further exemplary embodiment of the present disclosure. FIGS. 57-59 show the separability of antenna 1214 from mobile communication device 1212. It should be understood that the embodiments of FIGS. 53-60 described as a separable antenna can also be an integral with or to an article that is separate from the mobile communication device. In other words, the antenna is formed or captured within the article, which can be any one of the articles described herein.

Figure 60:
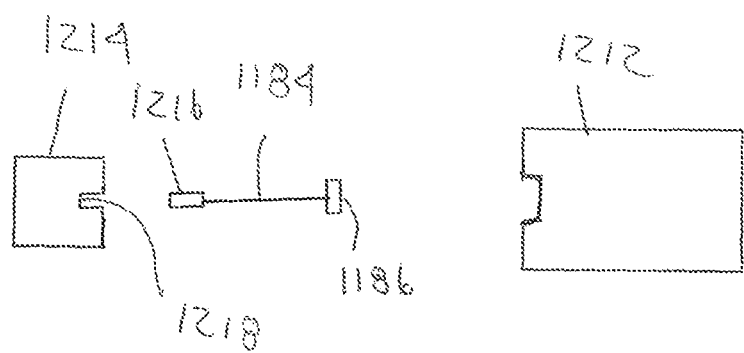
FIG. 60 shows a block diagram of a mobile communication device and a separable antenna in accordance with an even further exemplary embodiment of the present disclosure.

FIG. 60 shows a block diagram of a mobile communication device, which can be mobile communication device 1212, and a separable antenna, which can be antenna 1214 in accordance with an even further exemplary embodiment of the present disclosure. In this embodiment, wire or cable 1184 includes connector 1186 at one end configured to connect to mobile communication device 1212, and a connector 1216 at an opposite end that is configured to mate with an antenna connector 1218.

It should be broadly noted that the positions of the antenna and microphone shown in the various embodiments can be described, depending on the embodiment, as being eccentrically positioned with respect to a centerline of a respective mobile communication device, or positioned along a longitudinal center line. It should be apparent that any particular embodiment can be configured to include more than one microphone or speaker.

For the sake of brevity embodiments were shown as exemplary devices. One or more features of any embodiment can be used in combination to create a single embodiment; any part of any embodiment can be used as a replacement or addition to another embodiment to the extent such replacement or addition is possible; any combination of embodiments can be considered a single embodiment; and all resultant embodiments are within the scope of the present disclosure.

While various embodiments of the disclosure have been shown and described, it should be understood that these embodiments are not limited thereto. The embodiments may be changed, modified, and further applied by those skilled in the art. Therefore, these embodiments are not limited to the detail shown and described previously, but also include all such changes and modifications.

I claim:

1. A mobile communication system comprising:
a mobile communication device, the mobile communication device including a retractable wire positioned internal to the mobile communication device and extendable from the mobile communication device and retractable into the mobile communication device, and
a first antenna connected to the mobile communication device by the retractable wire, the first antenna being positioned on the housing when the retractable wire is retracted into the housing and positioned a spaced distance from the mobile communication device when the retractable wire is extended from the housing,
a second antenna positioned on or in the housing,
a transceiver, and
a switch positioned to transmit signals to the second antenna positioned on or in the housing, or to the retractable wire, and when the retractable wire is extended, the switch connects the transceiver to the first antenna connected to the retractable wire and disconnects signals from the second antenna positioned on or in the housing.

2. The mobile communication system of claim 1, wherein when the first antenna is positioned on the housing, the antenna is positioned in a cavity or recess.

3. The mobile communication system of claim 2, wherein the housing cavity or recess includes slides or rails, and the first antenna mates with the slides or rails.

4. The mobile communication system of claim 1, further including a second switch positioned between the first switch and the second antenna positioned on or in the housing, the second switch connected to a connector positioned on the mobile communication device, and when the second antenna is connected to the connector, the second switch connects the first switch to the connector.

5. The mobile communication system of 4, wherein at least one of the first antenna and the second antenna includes signal conditioning circuitry.

6. The mobile communication system of claim 1, wherein the first antenna is positioned in a cane [18], wherein at least one of the first antenna and the second antenna includes a power supply and an amplifier positioned to amplify signals received by the at least one of the first antenna and the second antenna.

* * * * *